US012205526B2

(12) United States Patent
Lee et al.

(10) Patent No.: US 12,205,526 B2
(45) Date of Patent: Jan. 21, 2025

(54) DISPLAY DEVICE CAPABLE OF HIGH COLOR REPRODUCTION AND METHOD OF DRIVING DISPLAY DEVICE

(71) Applicant: SAMSUNG DISPLAY CO., LTD., Yongin-si (KR)

(72) Inventors: Young Keun Lee, Yongin-si (KR); Min Kyung Kim, Yongin-si (KR); Hyo Sun Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/055,276

(22) Filed: Nov. 14, 2022

(65) Prior Publication Data

US 2023/0245617 A1 Aug. 3, 2023

(30) Foreign Application Priority Data

Jan. 17, 2022 (KR) ........................ 10-2022-0006731

(51) Int. Cl.
*G09G 3/32* (2016.01)

(52) U.S. Cl.
CPC ....... *G09G 3/32* (2013.01); *G09G 2300/0452* (2013.01); *G09G 2320/0242* (2013.01); *G09G 2330/021* (2013.01); *G09G 2360/16* (2013.01)

(58) Field of Classification Search
CPC ...... G09G 3/2003–2014; G09G 3/2074–2081; G09G 3/30–3291; G09G 2300/0452; G09G 2320/0242; G09G 2320/0666; G09G 2330/021; G09G 2340/06; G09G 2360/16
See application file for complete search history.

(56) References Cited

U.S. PATENT DOCUMENTS

| | | | | |
|---|---|---|---|---|
| 8,274,471 B2 | | 9/2012 | Kim et al. | |
| 10,957,235 B1 | * | 3/2021 | Buckley | G09G 3/2044 |
| 2008/0036943 A1 | * | 2/2008 | Matsumoto | G09G 3/3413 362/231 |
| 2009/0079359 A1 | * | 3/2009 | Shteynberg | H05B 45/24 315/291 |
| 2012/0162573 A1 | | 6/2012 | Takahashi et al. | |

(Continued)

FOREIGN PATENT DOCUMENTS

| | | |
|---|---|---|
| JP | 2012-003073 A | 1/2012 |
| JP | 2014-178537 A | 9/2014 |

(Continued)

*Primary Examiner* — Keith L Crawley
(74) *Attorney, Agent, or Firm* — Lewis Roca Rothgerber Christie LLP

(57) ABSTRACT

A display device includes a display panel including a pixel that includes sub-pixels for emitting light in respective colors, and a driver configured to adjust a current amount flowing through the sub-pixels and to adjust an emission duty of the sub-pixels, drive one sub-pixel among the sub-pixels having a luminance with a first current amount and with a first emission duty when a color coordinate of an image expressed by the pixel is within a reference color space, and drive the one sub-pixel having the luminance with a second current amount that is greater than the first current amount and with a second emission duty that is less than the first emission duty when the color coordinate is outside of the reference color space.

20 Claims, 14 Drawing Sheets

(56) References Cited

U.S. PATENT DOCUMENTS

| | | | | |
|---|---|---|---|---|
| 2014/0035960 | A1* | 2/2014 | You | G09G 3/3413 345/102 |
| 2014/0118408 | A1* | 5/2014 | Lee | G09G 5/02 345/690 |
| 2018/0144715 | A1* | 5/2018 | Shigeta | G09G 3/32 |
| 2021/0066243 | A1 | 3/2021 | Lee et al. | |
| 2021/0383771 | A1* | 12/2021 | Buckley | G06F 1/163 |

FOREIGN PATENT DOCUMENTS

| | | | |
|---|---|---|---|
| KR | 10-1441383 | B1 | 9/2014 |
| KR | 10-2019-0017647 | A | 2/2019 |
| KR | 10-2021-0027848 | A | 3/2021 |

* cited by examiner

<CASE1>

<CASE2>

LUT_W

| Section | Red | Green | Blue |
|---|---|---|---|
| 1 | 636 | 530 | 455 |
| 2 | 637 | 529 | 454 |
| 3 | 638 | 528 | 453 |
| 4 | 639 | 527 | 452 |
| 5 | 640 | 526 | 451 |

current increase

DISPLAY DEVICE CAPABLE OF HIGH COLOR REPRODUCTION AND METHOD OF DRIVING DISPLAY DEVICE

CROSS-REFERENCE TO RELATED APPLICATION

This application claims priority to, and the benefit of, Korean Patent Application No. 10-2022-0006731 filed on Jan. 17, 2022, and all the benefits accruing therefrom under 35 U.S.C. § 119, the content of which in its entirety is herein incorporated by reference.

BACKGROUND

1. Field

The present disclosure relates to a display device, and a method of driving the display device.

2. Description of the Related Art

In recent years, interest in an information display is being increased. Accordingly, research and development on the display device is continuously performed.

SUMMARY

An aspect of the disclosure provides a display device capable of high color reproduction (wide color gamut).

Aspects of the disclosure are not limited to that described above, and other aspects that are not described will be clearly understood by those skilled in the art from the following description.

According to embodiments of the disclosure, a display device includes a display panel including a pixel that includes sub-pixels for emitting light in respective colors, and a driver configured to adjust a current amount flowing through the sub-pixels and to adjust an emission duty of the sub-pixels, drive one sub-pixel among the sub-pixels having a luminance with a first current amount and with a first emission duty when a color coordinate of an image expressed by the pixel is within a reference color space, and drive the one sub-pixel having the luminance with a second current amount that is greater than the first current amount and with a second emission duty that is less than the first emission duty when the color coordinate is outside of the reference color space.

The sub-pixels may include an inorganic light emitting diode.

A peak wavelength of light emitted from the one sub-pixel may be shifted according to a current amount flowing through the one sub-pixel.

The pixel may include a first sub-pixel for emitting light in red, a second sub-pixel for emitting light in green, and a third sub-pixel for emitting light in blue, wherein the first sub-pixel includes an AlGaInP-based inorganic material, and wherein the second sub-pixel and the third sub-pixel include a GaN-based inorganic material.

Light emitted from the first sub-pixel may have a peak wavelength in a range of about 635 nm to about 640 nm, wherein light emitted from the second sub-pixel has a peak wavelength in a range of about 520 nm to about 530 nm, and wherein light emitted from the third sub-pixel has a peak wavelength in a range of about 450 nm to about 460 nm.

The second current amount may be about twice or more of the first current amount, and wherein the second emission duty is about ½ or less of the first emission duty.

The driver may include a first calculator configured to calculate the color coordinate of the pixel based on grayscale values corresponding to the sub-pixels, a second calculator configured to calculate power consumption of peak wavelengths of the one sub-pixel corresponding to the color coordinate, a selector configured to select a peak wavelength corresponding to least power consumption among the power consumption of the peak wavelengths, and a signal generator configured to determine a peak current and an emission duty for the one sub-pixel based on the peak wavelength.

The selector may be configured to select a shortest peak wavelength among the peak wavelengths when the one sub-pixel emits light in red.

The selector may be configured to select a longest peak wavelength among the peak wavelengths when the one sub-pixel emits light in green or blue.

Some of the sub-pixels may be configured to emit light with different emission duties.

The sub-pixels may be configured to emit light with a same emission duty.

The driver may include a first calculator configured to calculate a tristimulus value of the image based on grayscale values corresponding to the sub-pixels, a second calculator configured to determine a peak wavelength corresponding to the tristimulus value, and a signal generator configured to determine a peak current and an emission duty for the one sub-pixel based on the peak wavelength.

The driver may include a calculator configured to calculate a color coordinate of the pixel based on grayscale values corresponding to the sub-pixels, a determiner configured to determine whether the color coordinate is within the reference color space, and a signal generator configured to determine a peak current and an emission duty for the one sub-pixel based on a determination result of the determiner.

According to embodiments of the disclosure, a method of driving a display device may be performed in a display device including a pixel that includes sub-pixels for emitting light of different colors, the method including calculating a color coordinate of an image expressed by the pixel based on grayscale values corresponding to the pixel, and driving the sub-pixels by increasing a current amount flowing through at least one of the sub-pixels and decreasing an emission duty of the at least one of the sub-pixels based on the color coordinate when the color coordinate of the pixel for a same luminance is out of a reference color space.

The current amount may increase by about twice or more, and the emission duty decreases to about ½ or less, when the color coordinate of the pixel is out of the reference color space with respect to a same luminance.

The driving the sub-pixels may include calculating power consumption of peak wavelengths of one sub-pixel corresponding to the color coordinate, selecting a peak wavelength corresponding to least power consumption among the power consumption among the peak wavelengths, and determining a peak current and an emission duty for the one sub-pixel based on the peak wavelength.

A shortest peak wavelength may be selected among the peak wavelengths when the one sub-pixel emits light in red.

A longest peak wavelength may be selected among the peak wavelengths when the one sub-pixel emits light green or blue.

The driving the sub-pixels may include driving at least a portion of the sub-pixels with different emission duties.

According to embodiments of the disclosure, a display device includes a display panel including sub-pixels, and a driver configured to adjust a current amount flowing through the sub-pixels and to adjust an emission duty of the sub-pixels based on image data, operate in a first mode when an image corresponding to the image data is a normal image, and operate in a second mode wherein the current amount is larger than the current amount in the first mode, and the emission duty is less than the emission duty in the first mode, when the image corresponding to the image data is an image using wide color gamut.

Details of other embodiments are included in the detailed description and drawings.

The display device and the method of driving the display device according to embodiments of the disclosure may determine the current amount and the emission duty of each of the sub-pixels in the pixel based on the tristimulus value or the color coordinate of the pixel (or a target image to be displayed by the pixel). The peak wavelength of the light emitted from each of the sub-pixels may vary according to the current amount. Therefore, the display device may display an image of a high color area while reducing or minimizing power consumption.

An aspect according to embodiments is not limited by the contents exemplified above, and more various effects are included in the present specification.

BRIEF DESCRIPTION OF THE DRAWINGS

The above and other aspects of the disclosure will become more apparent by describing in further detail embodiments thereof with reference to the accompanying drawings, in which.

DETAILED DESCRIPTION

Figure 1:
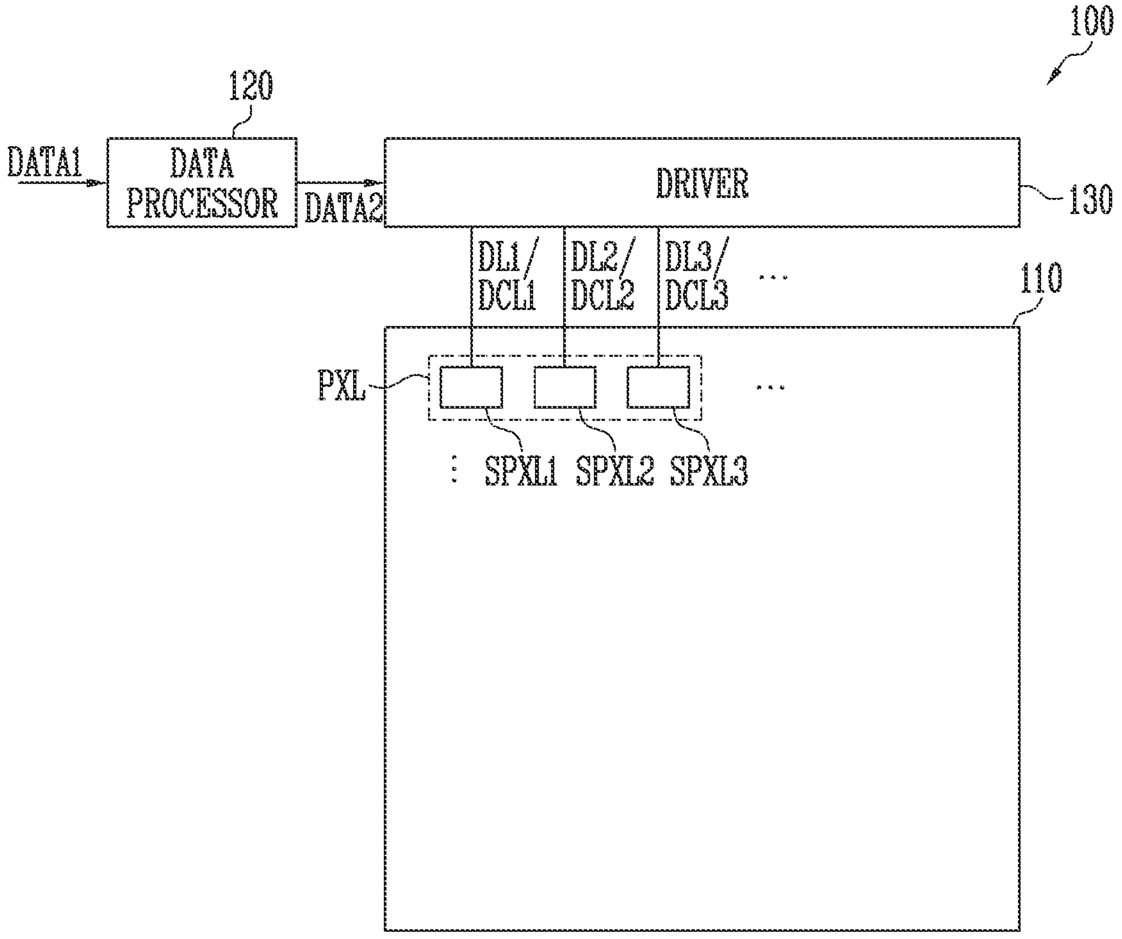
FIG. 1 is a diagram illustrating a display device according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of “1.0 to 10.0” is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112 (a) and 35 U.S.C. § 132 (a).

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

FIG. 1 is a diagram illustrating a display device according to one or more embodiments.

Referring to FIG. 1, the display device 100 may include a display unit 110 (or a display panel), a data processor 120, and a driver 130.

The display unit 110 may display an image. The display unit 110 may include data lines DL1, DL2, DL3, and . . . , which also may be referred to as current control lines, duty control lines DCL1, DCL2, DCL3, and . . . , which also may be referred to as emission control lines, and sub-pixels SPXL1, SPXL2, SPXL3, and . . . , noting that the term “sub-pixels SPXL1, SPXL2, SPXL3,” as used hereinafter, may also refer to additional, unlabeled sub-pixels. Each of the sub-pixels SPXL1, SPXL2, SPXL3 . . . may be connected to a corresponding data line among the data lines DL1, DL2, DL3, and . . . , noting that the term “data lines DL1, DL2, DL3,” as used hereinafter, may also refer to additional, unlabeled data lines. The sub-pixels SPXL1, SPXL2, SPXL3 also may be connected to a corresponding duty control line among the duty control lines DCL1, DCL2, DCL3, and . . . , noting that the term “duty control lines DCL1, DCL2, DCL3,” as used hereinafter, may also refer to additional, unlabeled duty control lines. For example, a first sub-pixel SPXL1 may be connected to a first data line DL1 and a first duty control line DCL1, a second sub-pixel SPXL2 may be connected to a second data line DL2 and a second duty control line DCL2, and the third sub-pixel SPXL3 may be connected to a third data line DL3 and a third duty control line DCL3.

The sub-pixels SPXL1, SPXL2, SPXL3 . . . may emit light with an intensity corresponding to a data signal (or a current control signal) provided through the data lines DL1, DL2, DL3 . . . , and may emit light with an emission duty (or an emission time, or duty cycle) corresponding to a duty control signal provided through the duty control lines DCL1, DCL2, DCL3. . . .

The first sub-pixel SPXL1, the second sub-pixel SPXL2, and the third sub-pixel SPXL3 may emit light in different colors (or different wavelength bands). For example, the first sub-pixel SPXL1 may emit light of red (or a red wavelength band), the second sub-pixel SPXL2 may emit light of green (or a green wavelength band), and the third sub-pixel SPXL3 may emit light of blue (or a blue wavelength band). For example, the first sub-pixel SPXL1 may emit light having a peak wavelength in a range of about 635 nm to about 640 nm, the second sub-pixel SPXL2 may emit light having a peak wavelength in a range of about 520 nm to about 530 nm, the third sub-pixel SPXL3 may emit light having a peak wavelength in a range of about 450 nm to about 460 nm. However, the disclosure is not limited thereto, and the first sub-pixel SPXL1, the second sub-pixel SPXL2, and the third sub-pixel SPXL3 may emit light in other colors (for example, cyan, magenta, yellow, and the like).

At least one first sub-pixel SPXL1, at least one second sub-pixel SPXL2, and at least one third sub-pixel SPXL3 may configure a pixel PXL, which may be a minimum unit that expresses full-color. That is, the pixel PXL may include at least one first sub-pixel SPXL1, at least one second sub-pixel SPXL2, and at least one third sub-pixel SPXL3.

Meanwhile, in FIG. 1, the first, second, and third sub-pixels SPXL1, SPXL2, and SPXL3 included in one row (or pixel row) are connected to the first, second, and third duty control lines DCL1, DCL2, and DCL3, which are different from each other, but the disclosure is not limited thereto. For example, the first, second, and third sub-pixels SPXL1, SPXL2, and SPXL3 included in one row may be connected to one duty control line. In this case, the emission duty of the first, second, and third sub-pixels SPXL1, SPXL2, and SPXL3 may be commonly controlled.

The data processor 120 may receive input image data DATA1 and a control signal from an external device (for example, a graphic processor), and may convert the input image data DATA1 based on the control signal to generate image data DATA2. The control signal may include a vertical synchronization signal, a reference clock signal, and the like. The vertical synchronization signal may indicate a start of frame data (that is, data corresponding to a frame period in which one frame image is displayed). For example, the data processor 120 may convert the input image data DATA1 into the image data DATA2 having a format matching pixel arrangement in the display unit 110. The data processor 120 may be implemented as an integrated circuit such as a timing controller (T-con).

The driver 130 may generate data signals (data voltages, or current control signals) based on the image data DATA2 provided from the data processor 120, and may provide the data signals to the display unit 110 (or the sub-pixels SPXL1, SPXL2, SPXL3 . . . ) through data lines DL1, DL2, DL3 . . . . For example, the driver 130 may be implemented as an integrated circuit, such as a source driver, and the source driver may include a latch that latches the image data DATA2, a digital-to-analog converter (or a decoder) that converts a latched image data (for example, digital data) into an analog data signal, and a buffer (or an amplifier) that outputs the data signal to the data line.

In addition, the driver 130 may generate duty control signals based on the image data DATA2, and may provide the duty control signals to the display unit 110 (or the sub-pixels SPXL1, SPXL2, SPXL3 . . . ) through the duty control lines DCL1, DCL2, DCL3 . . . . Each of the duty control signals may have a square wave shape.

For example, emission efficiency of the sub-pixels SPXL1, SPXL2, SPXL3 . . . for a low grayscale may be less than emission efficiency of the sub-pixels SPXL1, SPXL2, SPXL3 . . . for a high grayscale. A deviation between emission characteristics of the sub-pixels SPXL1, SPXL2, SPXL3 . . . may exist. Accordingly, precisely adjusting a luminance (or a luminance corresponding to the grayscale) of the pixel PXL may be difficult, or properly expressing an image of the low grayscale may be difficult only in a method of adjusting the data signal (or a current amount flowing through the sub-pixels SPXL1, SPXL2, SPXL3 . . . ). Therefore, when the image of the low grayscale is to be displayed, the driver 130 (or the display device 100) may maintain the current amount (or a data signal corresponding thereto) flowing through the sub-pixels SPXL1, SPXL2, SPXL3 . . . to be relatively high (for example, a current amount corresponding to a medium grayscale) and may adjust the emission duty of the sub-pixels SPXL1, SPXL2, SPXL3. . . .

In embodiments, the driver 130 may calculate a color coordinate (a chromaticity coordinate, or a tristimulus value) of the pixel PXL (or a target image to be displayed by the pixel PXL) based on grayscale values included in the image data DATA2, may determine whether the color coordinate (or the tristimulus value) of the pixel PXL is within a reference color space (or a reference stimulus value space), and may vary the data signals and the duty control signals based on the determination result. For example, the reference color space (or a reference color gamut) may be a standard color space (for example, sRGB) created for use in a monitor, printer, or the like. For example, when the color coordinate is out of the reference color space, the driver 130 may vary the data signals and the duty control signals so that the current amount (or a current magnitude) is increased and the emission duty is decreased concurrently or substantially simultaneously.

As will be described later, when the sub-pixels SPXL1, SPXL2, SPXL3 . . . include an inorganic light emitting element or an inorganic light emitting material, a peak wavelength of light emitted from the inorganic light emitting element may be shifted according to a current amount flowing through the inorganic light emitting element. The driver 130 may enable high color reproduction (increasing color reproduction rate, or wide color gamut) by using a characteristic in which the peak wavelength is shifted according to the current amount. For example, the driver 130 may express a color with high color purity by increasing the current amount flowing through at least one of the first, second, and third sub-pixels SPXL1, SPXL2, and SPXL3, and may express the same luminance by decreasing the emission duty of at least one of the first, second, and third sub-pixels SPXL1, SPXL2, and SPXL3.

A content of performing high color reproduction by varying the data signal (or the current amount) and the duty control signal is described later with reference to FIGS. 4 to 7.

As described above, the display device 100 may display an image having higher color purity by increasing the current amount, and by decreasing the emission duty of at least one of the pixel PXL (or the first, second, and third sub-pixels SPXL1, SPXL2, and SPXL3).

Meanwhile, each of the data processor 120 and the driver 130 may be implemented as a separate integrated circuit, but the present disclosure is not limited thereto. For example, the data processor 120 and the driver 130 may be implemented as one integrated circuit. In addition, a configuration for generating the data signal and a configuration for generating the duty control signal of the driver 130 may be implemented as separate integrated circuits.

Figure 2:
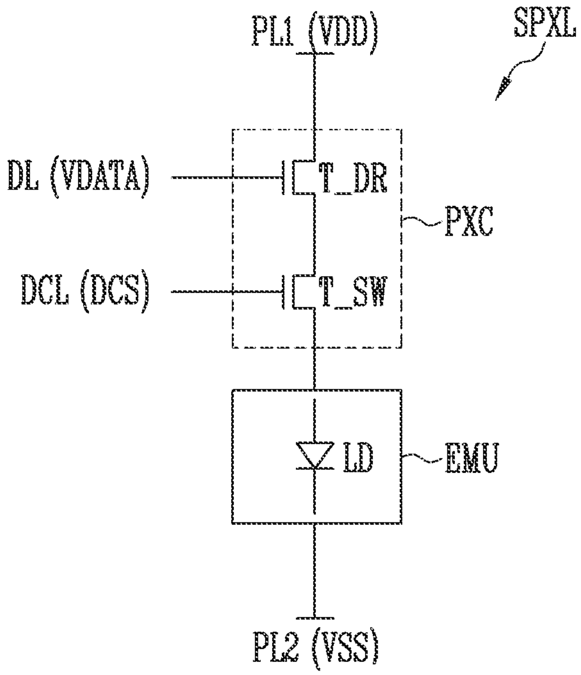
FIG. 2 is a diagram illustrating one or more embodiments of a sub-pixel included in the display device of FIG. 1.

FIG. 2 is a diagram illustrating one or more embodiments of a sub-pixel included in the display device of FIG. 1. The sub-pixel SPXL may be any one of the sub-pixels SPXL1, SPXL2, SPXL3 . . . of FIG. 1. The sub-pixels SPXL1, SPXL2, SPXL3 . . . may have configurations that are substantially identically to or similar to each other.

Referring to FIG. 2, the sub-pixel SPXL may include a light emitting unit EMU for generating light having an intensity (for example, a luminance) corresponding to a data signal VDATA, and a pixel circuit PXC for driving the light emitting unit EMU.

The light emitting unit EMU may include at least one light emitting element LD electrically connected between a first power line PL1 and a second power line PL2.

First power VDD may be applied to the first power line PL1, and second power VSS may be applied to the second power line PL2. The first power VDD and the second power VSS may have different voltage levels so that the light emitting element LD emits light. For example, a voltage level of the first power VDD may be higher than a voltage level of the second power VSS.

In one or more embodiments, the light emitting element LD may be an inorganic light emitting diode or may include an inorganic light emitting material. For example, the light emitting element LD may include an inorganic material based on GaN or AlGaInP. For example, the light emitting element LD may be configured of an inorganic light emitting diode, such as a micro light emitting diode (LED) or a quantum dot LED. As another example, the light emitting element LD may be configured of an LED in which an organic material and an inorganic material are combined.

The light emitting element LD may emit light with an intensity (for example, a luminance) corresponding to a driving current (or a current amount) supplied through the pixel circuit PXC. For example, during each frame period, the pixel circuit PXC may supply a driving current corresponding to a grayscale value to be expressed in a corresponding frame to the light emitting unit EMU.

The pixel circuit PXC may be electrically connected between the first power line PL1 and the light emitting unit EMU. The pixel circuit PXC may be electrically connected to a data line DL (or a current control line) and a duty control line DCL (or an emission control line). Referring to FIG. 1, for example, the sub-pixel SPXL may be the first sub-pixel SPXL1, the data line DL may be the first data line DL1, and the duty control line DCL may be the first duty control line DCL1.

According to one or more embodiments, the pixel circuit PXC may include a driving transistor T_DR and a switching transistor T_SW (or an emission control transistor).

The driving transistor T_DR is electrically connected between the first power line PL1 and the light emitting unit EMU. For example, a first electrode of the driving transistor T_DR may be electrically connected to the first power line PL1, and a second electrode of the driving transistor T_DR may be electrically connected to an anode electrode of the light emitting element LD through the switching transistor T_SW. One of the first electrode and the second electrode of the driving transistor T_DR may be a source electrode, and the other of the first electrode and the second electrode may be a drain electrode. A gate electrode of the driving transistor T_DR may be electrically connected to the data line DL. The driving transistor T_DR may operate in a linear area (that is, an area in which a current changes according to a voltage, or a voltage range), and may control the driving current supplied to the light emitting unit EMU in response to the data signal VDATA provided through the data line DL.

The switching transistor T_SW may be electrically connected between the driving transistor T_DR and the light emitting element LD. For example, a first electrode of the switching transistor T_SW may be electrically connected to the second electrode of the driving transistor T_DR, a second electrode of the switching transistor T_SW may be electrically connected to the anode electrode of the light emitting element LD, and a gate electrode of the switching transistor T_SW may be electrically connected to the duty control line DCL. The switching transistor T_SW may operate in a saturation area, and may be turned on in response to a duty control signal DCS (for example, a duty control signal DCS having a turn-on voltage level or an on-duty) provided through the duty control line DCL to electrically connect the driving transistor T_DR and the light emitting element LD. The emission time of the light emitting unit EMU may be adjusted according to a duty ratio (or an on-duty ratio) of the duty control signal DCS.

In FIG. 2, the switching transistor T_SW is connected between the driving transistor T_DR and the light emitting element LD, but the present disclosure is not limited thereto. For example, the switching transistor T_SW may be connected between the first power line PL1 and the driving transistor T_DR, or may be connected between the light emitting element LD and the second power line PL2.

In addition, both of the driving transistor T_DR and the switching transistor T_SW are shown as n-type transistors, but are not limited thereto. For example, at least one of the driving transistor T_DR and the switching transistor T_SW may be changed to a p-type transistor. In addition, the pixel circuit PXC may be configured as a pixel circuit of various structures and/or driving methods within a range in which the driving current and the emission duty may be adjusted.

Figure 3:
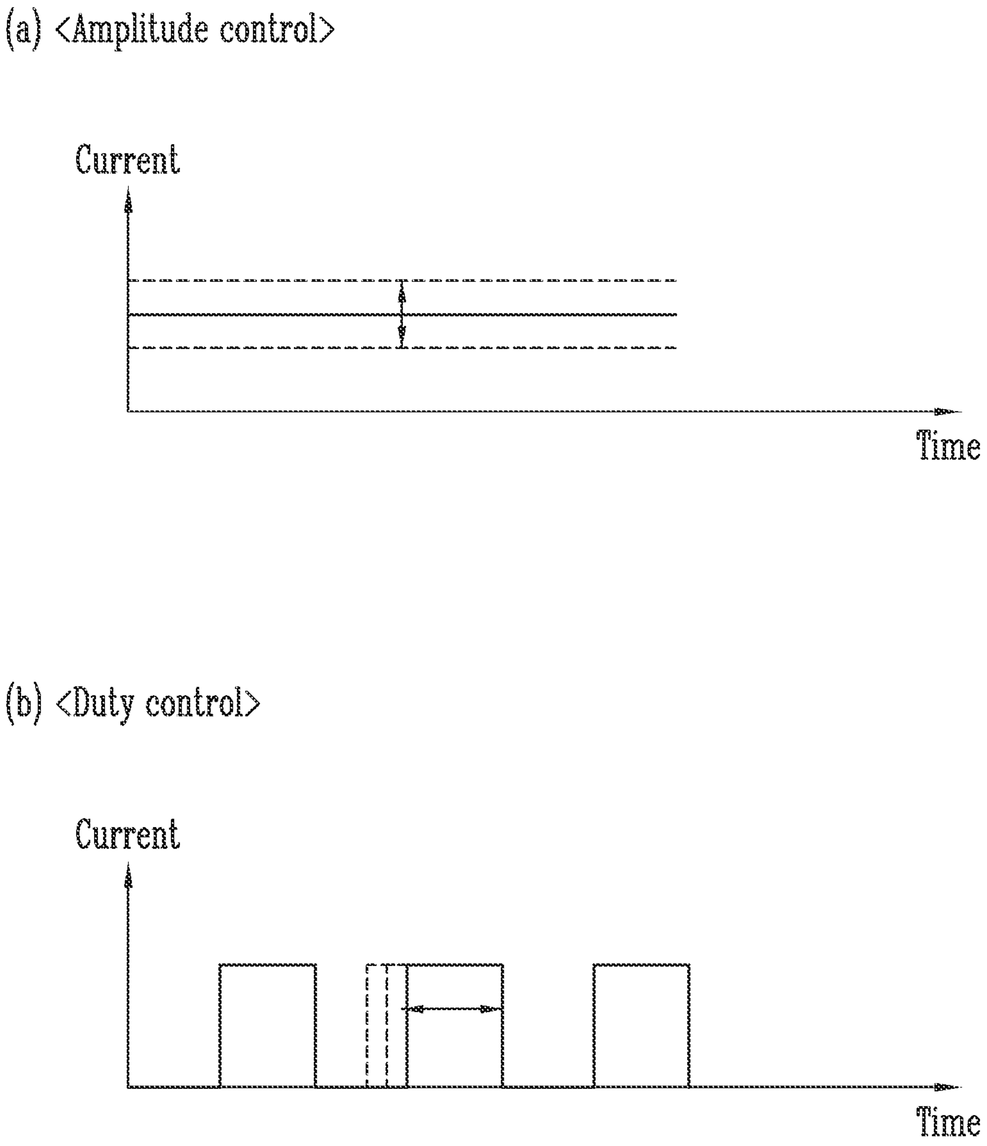
FIG. 3 is a diagram illustrating an operation of a driver included in the display device of FIG. 1.

FIG. 3 is a diagram illustrating an operation of the driver included in the display device of FIG. 1.

Referring to FIGS. 1 to 3, the driver 130 may adjust a magnitude of the driving current (or a current amount) flowing through the sub-pixel SPXL (that is, amplitude control), and may also adjust an emission duty (or a duty) of the sub-pixel SPXL (that is, duty control).

The driver 130 may adjust the magnitude of the driving current based on a grayscale value corresponding to the sub-pixel SPXL among the grayscale values included in the image data DATA2. For example, the driver 130 may adjust the magnitude of the driving current by providing a data signal having a size (or a voltage level) corresponding to the grayscale value to the sub-pixel SPXL. For example, the driver 130 may increase the magnitude of the driving current in response to a relatively large grayscale value, or may decrease the magnitude of the driving current in response to a relatively low grayscale value.

In addition, the driver 130 may adjust the emission duty based on the grayscale value corresponding to the sub-pixel SPXL among the grayscale values included in the image data DATA2. For example, in a state in which the magnitude of the driving current is fixed in response to a grayscale value (or a low grayscale value) that is lower than a reference grayscale value (for example, in a state in which the driving current is fixed to a magnitude corresponding to the reference grayscale value), the emission duty may be adjusted in response to the grayscale value. For example, the driver 130 may increase the emission duty in response to a relatively large grayscale value, or may decrease the emission duty in response to a relatively low grayscale value.

Figure 4:
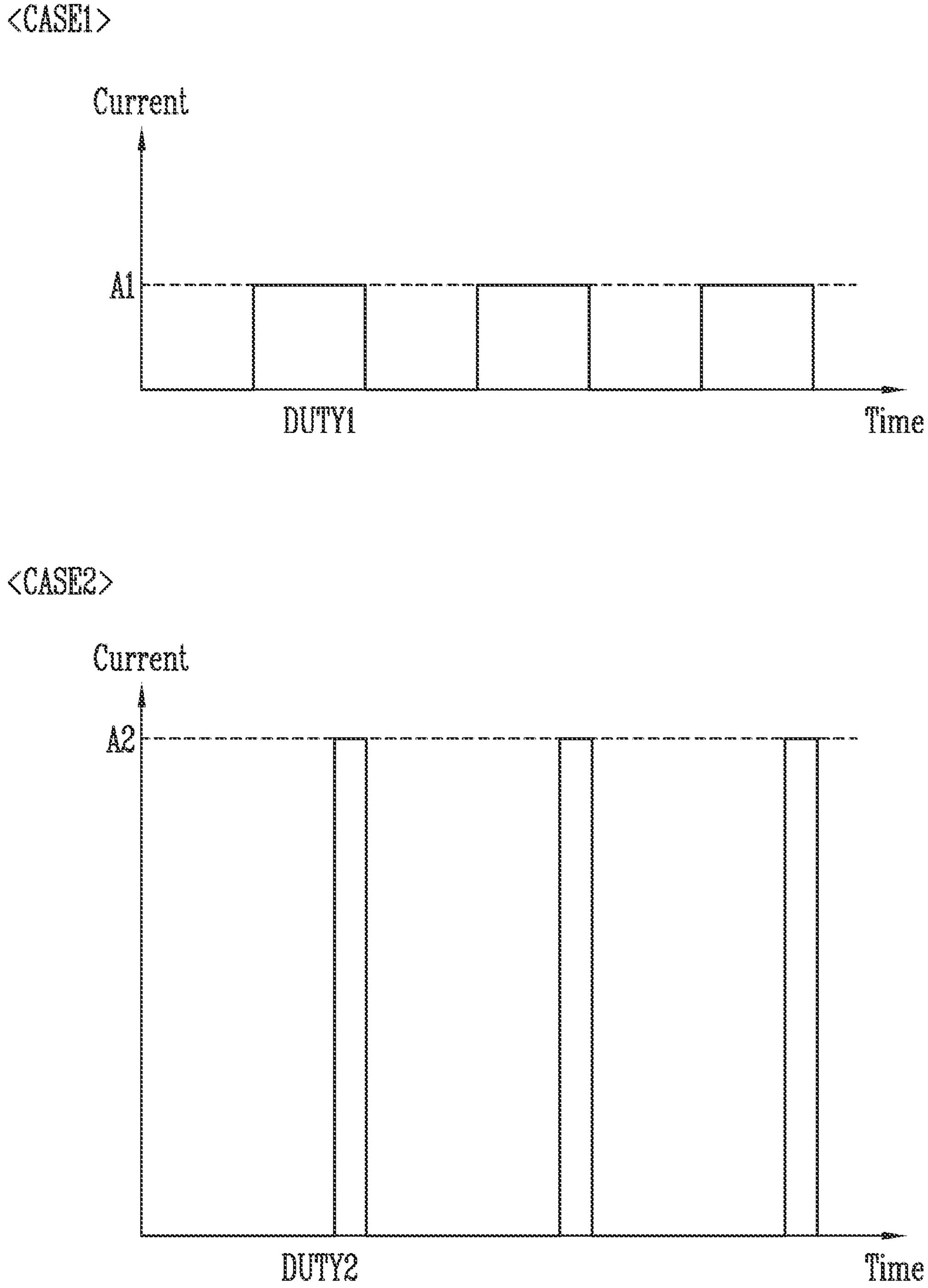
FIG. 4 is a diagram illustrating a method of driving the sub-pixel of FIG. 2.
Figure 5:
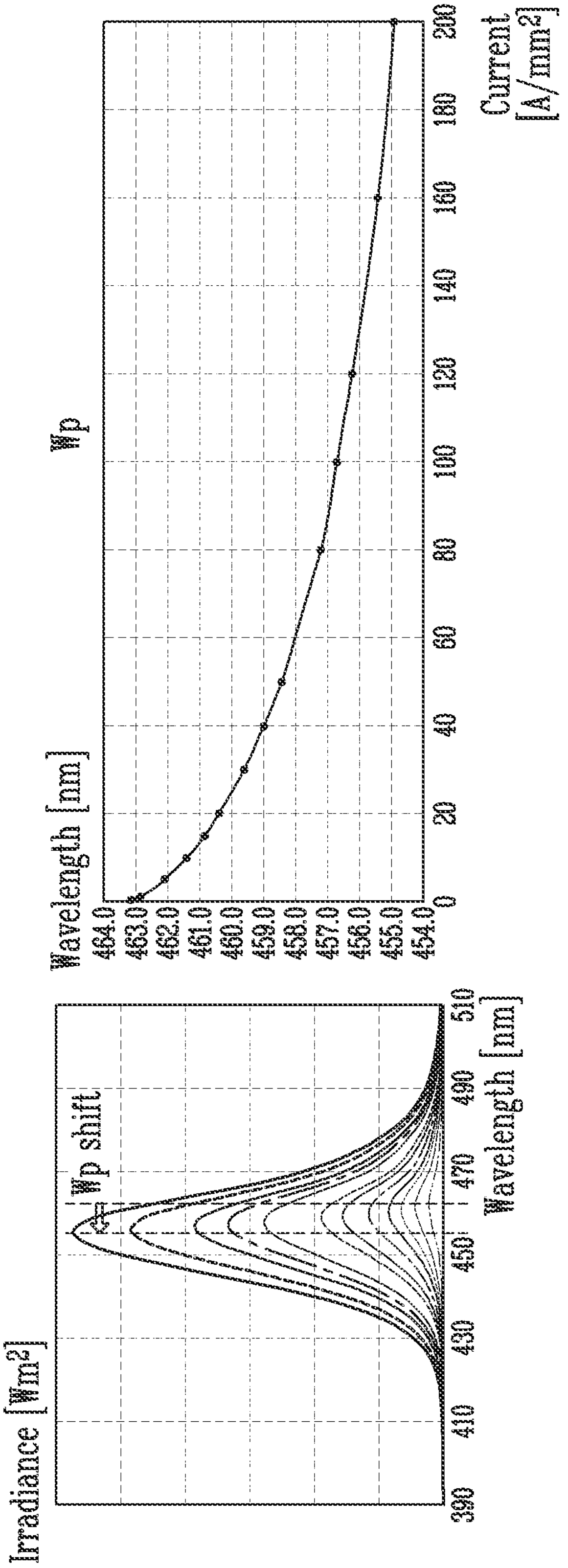
FIG. 5 is a diagram illustrating light emitted from the sub-pixel of FIG. 2.
Figure 6:
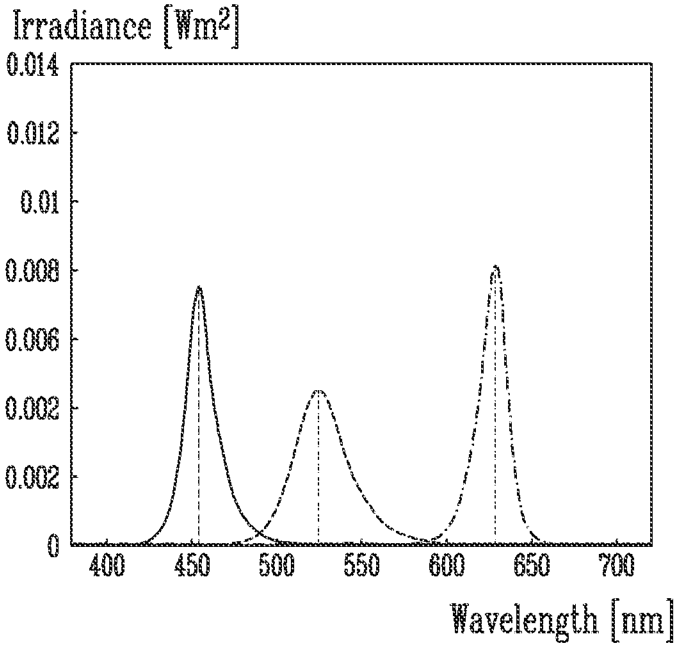
FIG. 6 is a diagram illustrating a spectrum of light emitted from the display device of FIG. 1.
Figure 6:
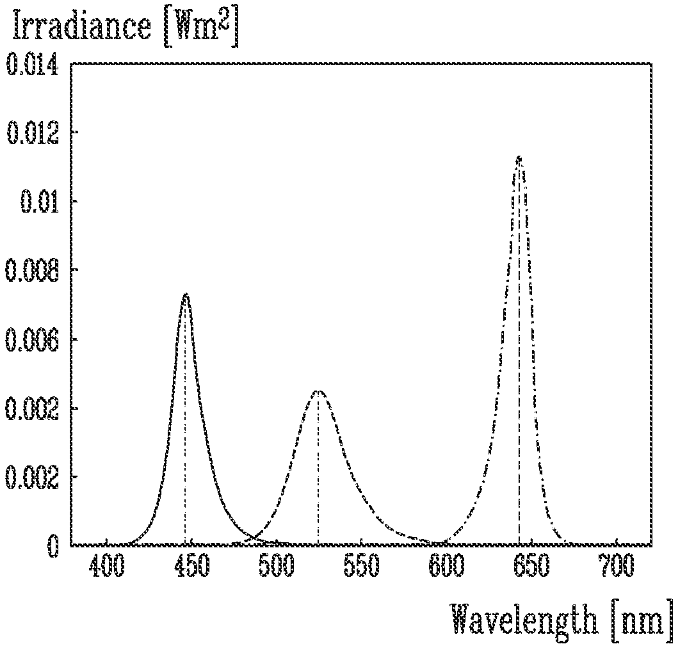
Figure 7:
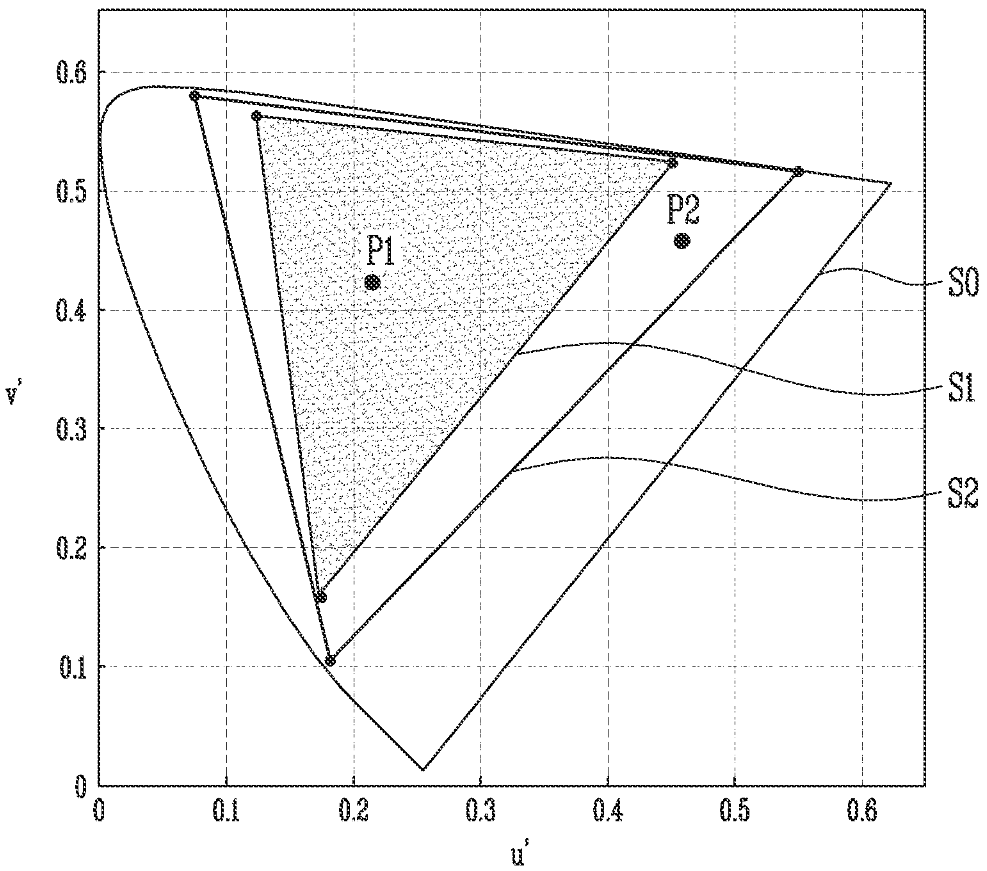
FIG. 7 is a diagram illustrating an expression range of the display device of FIG. 1.

FIG. 4 is a diagram illustrating a method of driving the sub-pixel of FIG. 2. FIG. 5 is a diagram illustrating light emitted from the sub-pixel of FIG. 2. FIG. 6 is a diagram illustrating a spectrum of light emitted from the display device of FIG. 1. FIG. 7 is a diagram illustrating an expression range of the display device of FIG. 1.

First, referring to FIGS. 1 to 4, the sub-pixel SPXL may be driven in various methods to emit light of a corresponding luminance. In other words, the display device 100 (or the driver 130) may allow the sub-pixel SPXL to emit light with a corresponding luminance in various methods.

For example, as in a first case CASE1 shown in FIG. 4, the display device 100 may allow a driving current (a current amount, or a peak current) of a first magnitude A1 to flow through the sub-pixel SPXL, and may also control to allow the sub-pixel SPXL to emit light with a first emission duty DUTY1.

As another example, as in a second case CASE2 shown in FIG. 4, the display device 100 may control to allow a driving current of a second magnitude A2 to flow through the sub-pixel SPXL, and may also control to allow the sub-pixel SPXL to emit light with a second emission duty DUTY2. For example, when a value obtained by multiplying the second magnitude A2 by the second emission duty DUTY2 is equal to or similar to a value obtained by multiplying the first magnitude A1 by the first emission duty DUTY1, a luminance (or an average luminance) of the sub-pixel SPXL according to the second case CASE2 may be about the same as a luminance of the sub-pixel SPXL according to the first case CASE1. For example, when the emission duty (that is, the first emission duty DUTY1) of the sub-pixel SPXL according to the first case CASE1 is 50%, the display device 100 may allow the sub-pixel SPXL to emit light with the same luminance by decreasing the emission duty to 12.5% and increasing the magnitude of the driving current flowing through the sub-pixel SPXL by four times. In other words, the display device 100 may allow the sub-pixel SPXL to emit light with the same luminance, by increasing the magnitude of the driving current by N (where N is an integer greater than or equal to 2) times and decreasing the emission duty to 1/N times.

As the magnitude of the driving current increases, power consumption may increase, but high color reproduction may be possible. This is because a peak wavelength of light emitted from the sub-pixel SPXL may be shifted according to the magnitude (or the current amount) of the driving current.

Referring to FIGS. 1 to 5, it is assumed that the sub-pixel SPXL (for example, the third sub-pixel SPXL3 of FIG. 1) is a blue sub-pixel (or a blue pixel) that emits light in blue, and that the light emitting element LD of the sub-pixel SPXL is an inorganic light emitting diode including a GaN (or InGaN)-based inorganic material.

As the magnitude of the driving current increases, light amount (or irradiance) emitted from the sub-pixel SPXL may increase, but a peak wavelength Wp (that is, a wavelength having maximum irradiance) of light may be shortened. As shown in FIG. 5, when a smallest driving current (for example, about 1 A/$mm^2$) flows through the sub-pixel SPXL, the peak wavelength Wp may be about 463 nm. When the driving current flowing through the sub-pixel SPXL is about 200 A/$mm^2$, the peak wavelength Wp may be about 455 nm. That is, as the magnitude of the driving current flowing through the blue sub-pixel increases, the peak wavelength Wp may be shifted to a shorter wavelength.

When the magnitude of the driving current is increased by 25% or more, the peak wavelength Wp may be shifted by about 1 nm. For example, when the drive current is about 80 A/$mm^2$, the peak wavelength Wp may be about 457 nm, and when the drive current is about 120 A/$mm^2$ (that is, when the drive current increases by about 50% based on 80 A/$mm^2$), the peak wavelength Wp may be about 456 nm.

In one or more embodiments, the sub-pixel SPXL (for example, the second sub-pixel SPXL2 (refer to FIG. 1)) may be a green sub-pixel (or a green pixel) that emits light in green, and the light emitting element LD of the sub-pixel SPXL may be an inorganic light emitting diode including a GaN-based inorganic material. In this case, similarly to the blue sub-pixel, as the driving current increases, the peak wavelength Wp of light emitted from the green sub-pixel may be shifted to a shorter wavelength. In one or more embodiments, the sub-pixel SPXL (for example, the first sub-pixel SPXL1 (refer to FIG. 1)) may be a red sub-pixel (or a red pixel) that emits light in red, and the light emitting element LD of the sub-pixel SPXL may be an inorganic light emitting diode including an AlGaInP (GaP, or GaInP)-based inorganic material. In this case, contrary to the blue sub-pixel, as the driving current increases, the peak wavelength Wp of light emitted from the red sub-pixel may be shifted to a long wavelength.

Referring to FIGS. 1 and 4 to 6, the display device 100 drives the first to third sub-pixels SPXL1, SPXL2, and SPXL3 (refer to FIG. 1) according to the first case CASE1 of FIG. 4, red light having a peak wavelength of about 635 nm (or about 630 nm), green light having a peak wavelength of about 530 nm, and blue light having a peak wavelength of 457 nm may be measured from the display device 100. For example, the display device 100 operating according to the first case CASE1 may have an expression range corresponding to a first color space S1 shown in FIG. 7.

Based on a UV color space, a natural color space S0 may indicate an area of visible light (for example, light in a wavelength range of about 400 nm to about 700 nm) that may be perceived by a human. The first color space S1 (or the reference color space) may indicate or correspond to a standard color space (for example, sRGB) created for use in a monitor, a printer, or the like.

When the display device 100 drives the first to third sub-pixels SPXL1, SPXL2, and SPXL3 (refer to FIG. 1) according to the second case CASE2 of FIG. 4, red light having a peak wavelength of about 640 nm, green light having a peak wavelength of about 526 nm, and blue light having a peak wavelength of 450 nm may be measured from the display device 100. In this case, the display device 100 operating according to the second case CASE2 may have an expression range corresponding to a second color space S2 shown in FIG. 7. The second color space S2 may include the first color space S1 and may be greater than the first color space S1.

When the display device 100 operates according to the second case CASE2, power consumption may be increased compared to the first case CASE1, but the display device 100 may have a higher color reproduction rate compared to the first case CASE1. In consideration of this, the display device 100 may drive the first to third sub-pixels SPXL1, SPXL2, and SPXL3 according to the first case CASE1 to display an image corresponding to the first color space S1 and may reduce power consumption. In addition, the display device 100 may drive at least one of the first to third sub-pixels SPXL1, SPXL2, and SPXL3 according to the second case CASE2 (that is, decrease the emission duty while increasing the magnitude of the driving current) to display an image corresponding to the second color space S2 (an image out of the first color space S1, or an image suitably having high color reproduction rate).

Figures 8, 9:
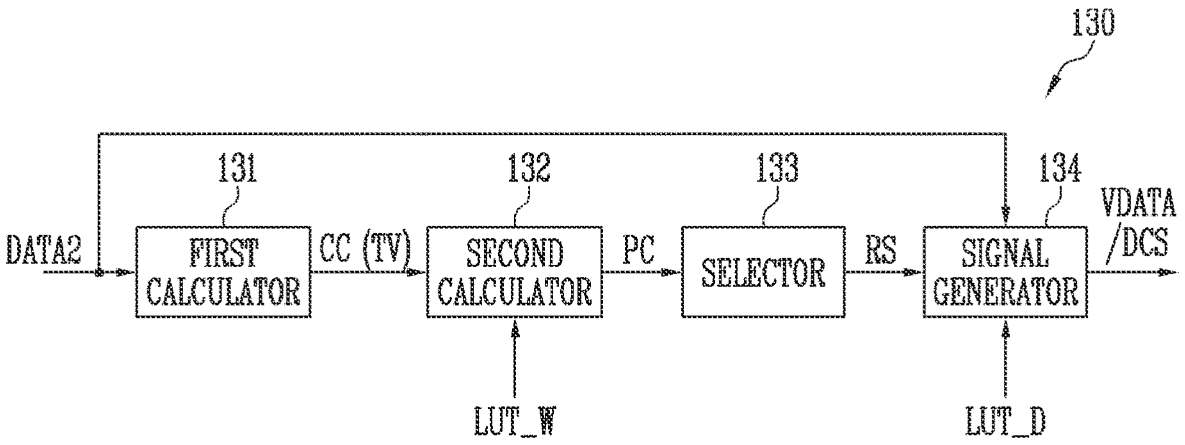
FIG. 8 is a diagram illustrating one or more embodiments of the driver included in the display device of FIG. 1.
FIG. 9 is a diagram illustrating one or more embodiments of a first lookup table used in the driver of FIG. 8.

FIG. 8 is a diagram illustrating one or more embodiments of the driver included in the display device of FIG. 1. FIG. 9 is a diagram illustrating one or more embodiments of a first lookup table used in the driver of FIG. 8.

Referring to FIGS. 1 and 8, the driver 130 may include a first calculator 131 (a first calculation circuit, a converter), a second calculator 132 (or a second calculation circuit), a selector 133 (or a selection circuit), and a signal generator 134 (or a signal generation circuit).

The first calculator 131 may calculate a tristimulus value TV or a color coordinate CC of the pixel PXL based on grayscale values corresponding to the first to third sub-pixels SPXL1, SPXL2, and SPXL3. The grayscale values may be included in the image data DATA2.

For example, the first calculator 131 may calculate the tristimulus value TV and/or the color coordinate CC in an XY color space of the pixel PXL by using a general RGB-to-XYZ conversion equation or conversion matrix, or may calculate the color coordinate CC in a UV color space of the pixel PXL by using an RGB-to-YUV conversion equation or conversion matrix.

The second calculator 132 may determine a range of the peak wavelength of the sub-pixel corresponding to the tristimulus value TV or the color coordinate CC calculated by the first calculator 131, and may calculate power consumption PC for each wavelength within the range.

In one or more embodiments, the second calculator 132 may determine the range of the peak wavelength corresponding to the tristimulus value TV (or the color coordinate CC) using the first lookup table LUT_W. As shown in FIG. 9, the first lookup table LUT_W may include information on the peak wavelength of the sub-pixel set for each section of the tristimulus value TV (or the color coordinate CC).

The selector 133 may select a wavelength having smallest power consumption PC among the wavelengths within the range.

The signal generator 134 may determine the current amount (the driving current, or the peak current) and the emission duty for the sub-pixel based on a selection result RS of the selector 133, and may output the data signal VDATA corresponding to the current amount and the duty control signal DCS corresponding to the emission duty.

Hereinafter, an operation of the driver 130 for a first point P1 and a second point P2 shown in FIG. 7 is described as an example.

For example, at the first point P1 shown in FIG. 7, a luminance may be about 300 nits, a color coordinate (for example, (Cx, Cy)) may be about (0.313, 0.329), and the tristimulus value (for example, (X, Y, Z)) may be about (128, 252, 90).

In this case, the second calculator 132 may determine the range of the peak wavelength of red as a first section to a fifth section (that is, about 636 nm to about 640 nm) based on an X component (for example, red) of the tristimulus value. In other words, it may mean that all wavelengths within the range of about 636 nm to about 640 nm may be used to display an image corresponding to the first point P1.

As described with reference to FIG. 5, because the peak wavelength of the light emitted from the red sub-pixel is shifted to the long wavelength as the driving current increases, power consumption of the red sub-pixel may be the smallest at about 636 nm (that is, the first section) and the power consumption of the red sub-pixel may be largest at about 640 nm (that is, the fifth section). Therefore, the selector 133 may select about 636 nm as the peak wavelength of the red sub-pixel. That is, in a case of the red sub-pixel, the selector 133 may select the shortest wavelength among the wavelengths within the range of the peak wavelength corresponding to the tristimulus value or the color coordinate as the peak wavelength of the red sub-pixel.

The signal generator 134 may determine the current amount (or the magnitude of the driving current) and the emission duty for the red sub-pixel (for example, the first sub-pixel SPXL1 (refer to FIG. 1)) based on the peak wavelength of about 636 nm selected by the selector 133. For example, the signal generator 134 may determine the current amount of the red sub-pixel (for example, the first sub-pixel SPXL1) so that light with the peak wavelength of 636 nm is emitted, and may determine the emission duty of the red sub-pixel based on the grayscale value (or a target luminance) and the determined current amount of the red sub-pixel. For example, the signal generator 134 may generate the current amount (or the data signal VDATA) and the emission duty (or the duty control signal DCS) by using a second lookup table LUT_D preset with respect to the peak wavelength. The second lookup table LUT_D may include information on the current amount (or the data signal VDATA) and the emission duty (or the duty control signal DCS) according to the peak wavelength and the grayscale value.

Similarly, the second calculator 132 may determine the range of the peak wavelength of green as a first section to a fifth section (that is, about 530 nm to about 526 nm) based on a Y component (for example, green) of the tristimulus value.

As described with reference to FIG. 5, because the peak wavelength of the light emitted from the green sub-pixel is shifted to the relatively short wavelength as the driving current increases, power consumption of the green sub-pixel may be smallest at about 530 nm (that is, the first section), and the power consumption of the green sub-pixel may be greatest at about 526 nm (that is, the fifth section). Therefore, the selector 133 may select 530 nm as the peak wavelength of the green sub-pixel. That is, in a case of the green sub-pixel, the selector 133 may select the longest wavelength among the wavelengths within the range of the peak wavelength corresponding to the tristimulus value or the color coordinate as the peak wavelength of the green sub-pixel. The signal generator 134 may determine the current amount (or the magnitude of driving current) and the emission duty for the green sub-pixel (for example, the second sub-pixel SPXL2 (refer to FIG. 1)) based on the peak wavelength of about 530 nm selected by the selector 133. For example, the signal generator 134 may determine the current amount of the green sub-pixel (for example, the second sub-pixel SPXL2) so that light with a peak wavelength of about 530 nm is emitted, and determine the emission duty of the green sub-pixel based on the grayscale value (or a target luminance) and the determined current amount of the green sub-pixel.

Similarly, the second calculator 132 may determine the range of the peak wavelength of blue as a first section to a fifth section (that is, about 451 nm to about 455 nm) based on a Z component (for example, blue) of the tristimulus value.

As described with reference to FIG. 5, because the peak wavelength of the light emitted from the blue sub-pixel is shifted to the relatively short wavelength as the driving current increases, power consumption of the blue sub-pixel may be the smallest at 455 nm (that is, the first section), at the power consumption of the blue sub-pixel may be greatest at about 451 nm (that is, the fifth section). Therefore, the selector 133 may select about 455 nm as the peak wavelength of the blue sub-pixel. That is, in a case of the blue sub-pixel, the selector 133 may select the longest wavelength among the wavelengths within the range of the peak wavelength corresponding to the tristimulus value or the color coordinate as the peak wavelength of the blue sub-pixel.

The signal generator 134 may determine the current amount (or the magnitude of the driving current) and the emission duty of the blue sub-pixel (for example, the third sub-pixel SPXL3 (refer to FIG. 1)) based on the peak wavelength of about 455 nm selected by the selector 133.

In this case, each of the first to third sub-pixels SPXL1, SPXL2, and SPXL3 in the pixel PXL (FIG. 1) may be driven according to the first case CASE1 shown in FIG. 4.

As another example, at the second point P2 shown in FIG. 7, the luminance may be about 50 nits, the color coordinate (for example, (Cx, Cy)) may be about (0.620, 0.260), and the tristimulus value (for example, (X, Y, Z)) may be about (626, 84, 57).

In this case, the second calculator 132 may determine the range of the peak wavelength of red as a third section to a fifth section (that is, about 638 nm to about 640 nm) based on the X component (for example, red) of the tristimulus value. In other words, it may mean that wavelengths within the range of about 638 nm to about 640 nm may be used to display an image corresponding to the second point P2.

In the range of about 638 nm to about 640 nm, the power consumption of the red sub-pixel may be the smallest at about 638 nm (that is, the third section). Therefore, the selector 133 may select about 638 nm as the peak wavelength of the red sub-pixel.

The signal generator 134 may determine the current amount (or the magnitude of the driving current) and the emission duty for the red sub-pixel (for example, the first sub-pixel SPXL1 (refer to FIG. 1)) based on the peak wavelength of about 638 nm selected by the selector 133. For example, the signal generator 134 may increase the current amount by twice and decrease the emission duty to at least ½ as compared to the red sub-pixel emitting the light having the peak wavelength of about 640 nm.

Similarly, the second calculator 132 may determine the range of the peak wavelength of green as the first section to the fifth section (that is, about 526 nm to about 530 nm) based on the Y component (for example, green) of the tristimulus value, and the selector 133 may select about 530 nm as the peak wavelength of the green sub-pixel. The signal generator 134 may determine the current amount (or the magnitude of the driving current) and the emission duty for the green sub-pixel (for example, the second sub-pixel SPXL2 (refer to FIG. 1)) based on the peak wavelength of about 530 nm selected by the selector 133.

Similarly, the second calculator 132 may determine the range of the peak wavelength of blue as a fourth section to a fifth section (that is, about 451 nm to about 452 nm) based on the Z component (for example, blue) of the tristimulus value, and the selector 133 may select about 452 nm as the peak wavelength of the blue sub-pixel.

The signal generator 134 may determine the current amount (or the magnitude of the driving current) and the emission duty of the blue sub-pixel (for example, the third sub-pixel SPXL3 (refer to FIG. 1)) based on the peak wavelength of about 452 nm selected by the selector 133. For example, the signal generator 134 may increase the current amount by four times and decrease the emission duty to at least ¼ level as compared to the blue sub-pixel emitting light having the peak wavelength of about 455 nm.

In this case, the first and third sub-pixels SPXL1 and SPXL3 in the pixel PXL (FIG. 1) may be driven according to the second case CASE2 shown in FIG. 4, and the first to third sub-pixels SPXL1, SPXL2, and SPXL3 may be driven with different emission duties. That is, when the color coordinate CC corresponding to the pixel PXL is out of the reference color space (for example, the first color space S1 of FIG. 7), at least some of the first to third sub-pixels SPXL1, SPXL2, and SPXL3 in the pixel PXL may emit light with different emission duties.

However, the emission duties of the first to third sub-pixels SPXL1, SPXL2, and SPXL3 in the pixel PXL are individually controlled, but the disclosure is not limited thereto. For example, the selector 133 may select a peak wavelength included in the highest section, for example, a peak wavelength of about 452 nm of the fourth section, and output information on the peak wavelength of about 452 nm as the selection result RS. In this case, the driver 130 may be driven according to the second case CASE2 of FIG. 4, and may equally control the emission duty of the first to third sub-pixels SPXL1, SPXL2, and SPXL3.

As described above, the driver 130 may calculate the tristimulus value TV or the color coordinate CC of the pixel PXL, and may determine the current amount and the emission duty of each of the first to third sub-pixels SPXL1, SPXL2, and SPXL3 in the pixel PXL based on the tristimulus value TV or the color coordinate CC. Through this, the display device 100 may display an image of a high color area while reducing or minimizing power consumption.

Meanwhile, in FIG. 8, the second calculator 132 calculates the range of the peak wavelength corresponding to the tristimulus value TV or the color coordinate CC and the power consumption for each wavelength within the range, but the disclosure is not limited thereto. For example, the second calculator 132 may not calculate power consumption separately, and may select and output the longest or shortest wavelength (for example, the shortest wavelength related to red or the longest wavelength related to blue and green) within the range of the peak wavelength. In this case, the selector 133 may be omitted or may be integrated into the second calculator 132.

Figure 10:
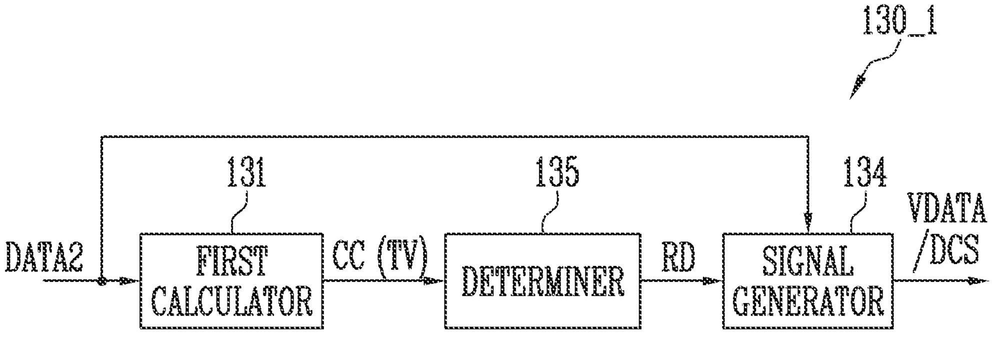
FIG. 10 is a diagram illustrating one or more other embodiments of the driver included in the display device of FIG. 1.

FIG. 10 is a diagram illustrating one or more other embodiments of the driver included in the display device of FIG. 1.

Referring to FIGS. 1 and 10, the driver 130_1 may include the first calculator 131 (the calculation circuit, or the converter), a determiner 135 (or a determination circuit), and the signal generator 134 (or the signal generation circuit). Because the first calculator 131 and the signal generator 134 are described with reference to FIG. 9, an overlapping description is not be repeated.

The determiner 135 may determine whether the color coordinate CC (or the tristimulus value TV) calculated by the first calculator 131 is within the reference color space (or the reference stimulus value space). Here, the reference color space may correspond to the first color space S1 shown in FIG. 7.

The signal generator 134 may determine the current amount and the emission duty for the sub-pixel based on a determination result RD of the determiner 135, and output the data signal VDATA corresponding to the current amount and the duty control signal DCS corresponding to the emission duty.

For example, with respect to the first point P1 shown in FIG. 7, the determiner 135 may determine that the color coordinate CC of the pixel PXL is within the first color space S1. In this case, according to the determination result RD that the color coordinate CC is within the first color space S1, the signal generator 134 may determine or may select the current amount and the emission duty in which power consumption is reduced or minimized. For example, the determination result RD that the color coordinate CC is within the first color space S1 may correspond to the wavelengths (for example, about 636 nm, about 530 nm, and about 455 nm) of the first section shown in FIG. 9. Each of the first to third sub-pixels SPXL1, SPXL2, and SPXL3 in the pixel PXL may be driven according to the first case CASE1 shown in FIG. 4.

As another example, with respect to the second point P2 shown in FIG. 7, the determiner 135 may determine that the color coordinate CC of the pixel PXL is out of the first color space S1. In this case, according to the determination result RD that the color coordinate CC is out of the first color space S1, the signal generator 134 may determine or may select the current amount and the emission duty in which high color reproduction is possible. For example, the determination result RD that the color coordinate CC is out of the first color space S1 may correspond to the wavelengths (for example, about 640 nm, about 526 nm, and about 451 nm) of the fifth section shown in FIG. 9. Each of the first to third sub-pixels SPXL1, SPXL2, and SPXL3 in the pixel PXL may be driven according to the second case CASE2 shown in FIG. 4.

As described above, the driver 130_1 may calculate the color coordinate CC (or the tristimulus value TV) of the pixel PXL, may determine whether the color coordinate CC (or the tristimulus value TV) is within the reference color space (or the reference stimulus value space), and may determine a driving method (for example, a driving method according to the first case CASE1 or a driving method according to the second case CASE2 shown in FIG. 4) of the first to third sub-pixels SPXL1, SPXL2, and SPXL3 in the pixel PXL based on the determination result RD.

Figure 11:
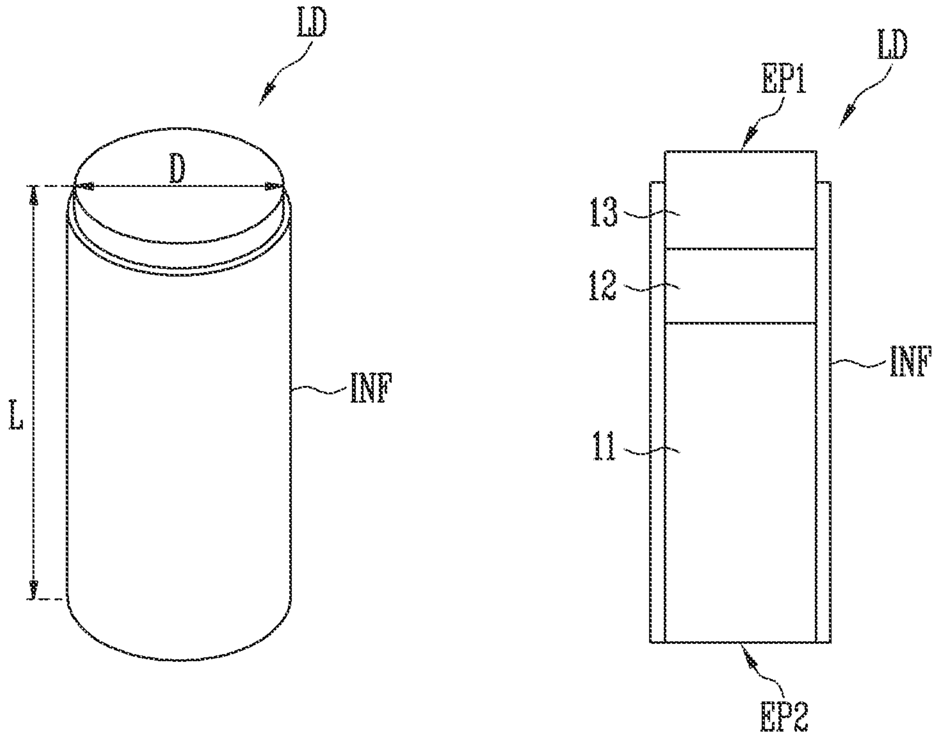
FIG. 11 depicts perspective and cross-sectional views illustrating a light emitting element according to one or more embodiments.

FIG. 11 is perspective and cross-sectional views illustrating a light emitting element according to one or more embodiments. FIG. 11 shows a column shape light emitting element LD, but a type and/or a shape of the light emitting element LD are/is not limited thereto.

Referring to FIG. 11, the light emitting element LD may include a first semiconductor layer 11, a second semiconductor layer 13, and an active layer 12 interposed between the first and second semiconductor layers 11 and 13. For example, when an extension direction of the light emitting element LD is a length L direction, the light emitting element LD may include the first semiconductor layer 11, the active layer 12, and the second semiconductor layer 13 sequentially stacked along the length L direction.

The light emitting element LD may be provided in a column shape extending along one direction. The light emitting element LD may have a first end EP1 and a second end EP2. One of the first and second semiconductor layers 11 and 13 may be located at the first end EP1 of the light emitting element LD. The other of the first and second semiconductor layers 11 and 13 may be located at the second end EP2 of the light emitting element LD.

According to one or more embodiments, the light emitting element LD may be a light emitting element manufactured in a column shape through an etching method or the like. In the present specification, the column shape includes a rod-like shape or a bar-like shape that is long in the length L direction (that is, an aspect ratio is greater than 1), such as a circular column or a polygonal column, and the shape of the cross-section thereof is not particularly limited. For example, the length L of the light emitting element LD may be greater than a diameter D (or a width of a cross section).

The light emitting element LD may have a size as small as a nanometer scale to a micrometer scale. For example, each light emitting element LD may have the diameter D (or width) and/or the length L of a nanometer scale to micrometer scale range. However, a size of the light emitting element LD is not limited thereto, and the size of the light emitting element LD may be variously changed according to a design condition of various devices using a light emitting device using the light emitting element LD as a light source, for example, a display device.

The first semiconductor layer 11 may be a semiconductor layer of a first conductivity type. For example, the first semiconductor layer 11 may include an n-type semiconductor layer. For example, the first semiconductor layer 11 may include any one of InAlGaN, GaN, AlGaN, InGaN, AlN, and InN, and may include an n-type semiconductor layer doped with a first conductivity type dopant such as Si, Ge, and Sn. However, the material configuring the first semiconductor layer 11 is not limited thereto, and the first semiconductor layer 11 may be formed of various other materials.

The active layer 12 may be located on the first semiconductor layer 11 and may be formed in a single quantum well or multi-quantum well structure. A position of the active layer 12 may be variously changed according to the type of the light emitting element LD.

In one or more embodiments, a clad layer doped with a conductive dopant may be formed on and/or under the active layer 12. For example, the clad layer may be formed of AlGaN or InAlGaN. According to one or more embodiments, a material of AlGaN, InAlGaN, or the like may be used to form the active layer 12, and various other materials may configure the active layer 12. For example, when the active layer 12 emits light of a red wavelength band, the active layer 12 may include an AlGaInP-based material. For example, when the active layer 12 emits light of a green or blue wavelength band, the active layer 12 may include a GaN-based material.

The second semiconductor layer 13 may be located on the active layer 12 and may include a semiconductor layer of a type that is different from that of the first semiconductor layer 11. For example, the second semiconductor layer 13 may include a p-type semiconductor layer. For example, the second semiconductor layer 13 may include at least one semiconductor material among InAlGaN, GaN, AlGaN, InGaN, AlN, and InN, and may include a p-type semiconductor layer doped with a second conductivity type dopant such as Mg. However, the material configuring the second semiconductor layer 13 is not limited thereto, and various other materials may configure the second semiconductor layer 13.

When a voltage equal to or greater than a threshold voltage is applied to both ends of the light emitting element LD, an electron-hole pair is combined in the active layer 12 and thus the light emitting element LD emits light. By controlling light emission of the light emitting element LD using such an aspect, the light emitting element LD may be used as a light source of various light emitting devices including a pixel (or a sub-pixel) of a display device.

The light emitting element LD may further include an insulating film INF provided on a surface. The insulating film INF may be formed on the surface of the light emitting element LD to surround (e.g., in plan view) an outer circumferential surface of at least active layer 12, and may further surround one region of the first and second semiconductor layers 11 and 13.

According to one or more embodiments, the insulating film INF may expose both ends of the light emitting element LD having different respective polarities. For example, the insulating film INF may expose one end of each of the first and second semiconductor layers 11 and 13 positioned at the first and second ends EP1 and EP2 of the light emitting element LD. In one or more other embodiments, the insulating film INF may expose a side portion of the first and second semiconductor layers 11 and 13 adjacent to the first and second ends EP1 and EP2 of the light emitting element LD having different polarities.

According to one or more embodiments, the insulating film INF may include at least one insulating material among silicon oxide ($SiO_x$), silicon nitride ($SiN_x$), silicon oxynitride ($SiO_xN_y$), aluminum oxide ($AlO_x$), and titanium oxide ($TiO_x$), and may be configured of a single layer or multiple layers (for example, a double layer configured of aluminum oxide ($AlO_x$) and silicon oxide ($SiO_x$)), but the present disclosure is not limited thereto. According to one or more embodiments, the insulating film INF may be omitted.

When the insulating film INF is provided to cover a surface of the light emitting element LD, for example, an outer circumferential surface of the active layer 12, the likelihood of a short between the active layer 12 and a first pixel electrode, a second pixel electrode, or the like to be described later may be reduced or prevented. Accordingly, electrical stability of the light emitting element LD may be secured.

In addition, when the insulating film INF is provided on the surface of the light emitting element LD, a surface defect of the light emitting element LD may be reduced or minimized, thereby improving life and efficiency. In addition, also in a case where a plurality of light emitting elements LD are located in close contact with each other, the likelihood of an unwanted short circuit between the light emitting elements LD may be reduced or prevented.

In one or more embodiments, the light emitting element LD may further include an additional component in addition to the first semiconductor layer 11, the active layer 12, the second semiconductor layer 13, and/or the insulating film INF surrounding them. For example, the light emitting element LD may further include at least one phosphor layer, an active layer, a semiconductor layer and/or an electrode layer located on one end side of the first semiconductor layer 11, the active layer 12 and/or the second semiconductor layer 13. For example, a contact electrode layer may be located at each of first and second ends EP1 and EP2. Meanwhile, although the column shape light emitting element LD is exemplified in FIG. 11, the type, structure and/or shape of the light emitting element LD may be variously changed. For example, the light emitting element LD may be formed in a core-shell structure having a polygonal cone shape.

A light emitting device including the light emitting element LD described above may be used in various types of devices that suitably use a light source, including a display device. For example, a plurality of light emitting elements LD may be located in each sub-pixel of the display device 100 (refer to FIG. 1), and the light emitting elements LD may be used as a light source of each sub-pixel. However, an application field of the light emitting element LD is not limited to the above-described example. For example, the light emitting element LD may also be used in other types of devices that suitably use a light source, such as a lighting device.

Figure 12:
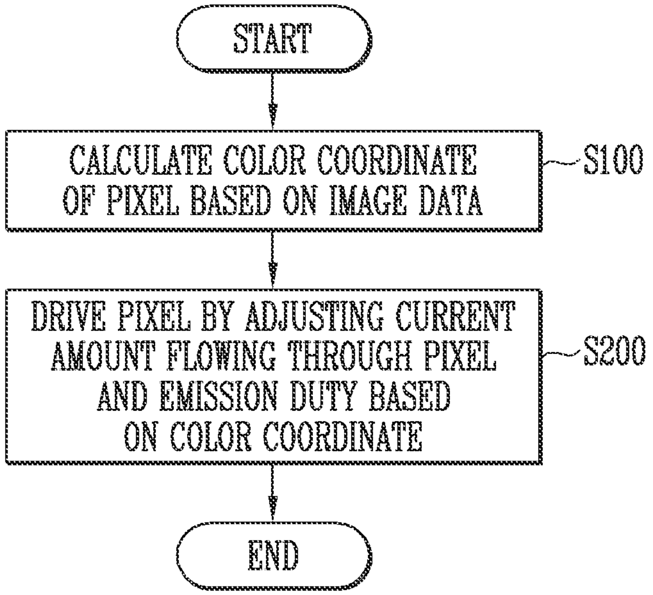
FIG. 12 is a flowchart illustrating a method of driving a display device according to one or more embodiments.
Figure 13:
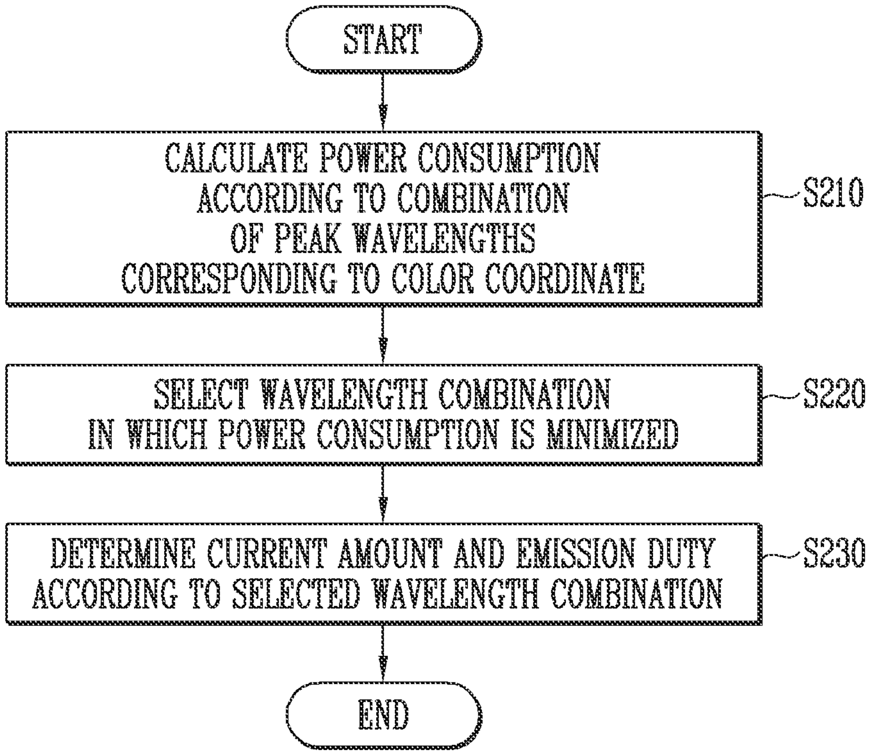
FIG. 13 is a flowchart illustrating an operation of driving a pixel of FIG. 12.

FIG. 12 is a flowchart illustrating a method of driving a display device according to one or more embodiments. FIG. 13 is a flowchart illustrating an operation of driving a pixel of FIG. 12.

Referring to FIGS. 1, 12, and 13, the method of FIG. 12 may be performed in the display device 100 (or the driver 130) of FIG. 1.

The method of FIG. 12 may calculate the color coordinate or the tristimulus value of the pixel PXL based on the image data DATA2 (S100).

As described with reference to FIG. 8, the method of FIG. 12 may calculate the color coordinate or the tristimulus value based on the grayscale values corresponding to the first to third sub-pixels SPXL1, SPXL2, and SPXL3 in the pixel PXL. The grayscale values may be included in the image data DATA2.

Thereafter, the method of FIG. 12 may drive the pixel PXL by adjusting the current amount (the magnitude of the driving current, or the peak current) flowing through the pixel PXL and the emission duty based on the color coordinate or the tristimulus value (S200).

In one or more embodiments, as described with reference to FIG. 10, the method of FIG. 12 may determine whether the color coordinate (or the tristimulus value) of the pixel PXL is within the reference color space (or the reference stimulus value space), and may determine a driving method of the first to third sub-pixels SPXL1, SPXL2, and SPXL3 in the pixel PXL based on the determination result.

For example, as described with reference to FIG. 10, when the color coordinate of the pixel PXL corresponds to the first point P1 (refer to FIG. 7), the method of FIG. 12 may drive the first to third sub-pixels SPXL1, SPXL2, and SPXL3 according to the first case CASE1 (refer to FIG. 4). As another example, as described with reference to FIG. 10, when the color coordinate of the pixel PXL corresponds to the second point P2 (refer to FIG. 7), the method of FIG. 12 may drive the first to third sub-pixels SPXL1, SPXL2, and SPXL3 according to the second case CASE2 (refer to FIG. 4).

In one or more other embodiments, as described with reference to FIG. 8, the method of FIG. 13 may determine the range of the peak wavelength of each of the first to third sub-pixels SPXL1, SPXL2, and SPXL3 corresponding to the color coordinate (or the tristimulus value) of the pixel PXL, may calculate power consumption according to a combination of the peak wavelengths of the first to third sub-pixels SPXL1, SPXL2, and SPXL3 (S210), may select a wavelength combination in which the power consumption is reduced or minimized (that is, the peak wavelength of each of the first to third sub-pixels SPXL1, SPXL2, and SPXL3) (S220), and may determine the current amount and the emission duty according to the selected wavelength combination (S230).

Through this, the method of FIG. 13 may display an image of a high color area while reducing or minimizing power consumption.

Figure 14:
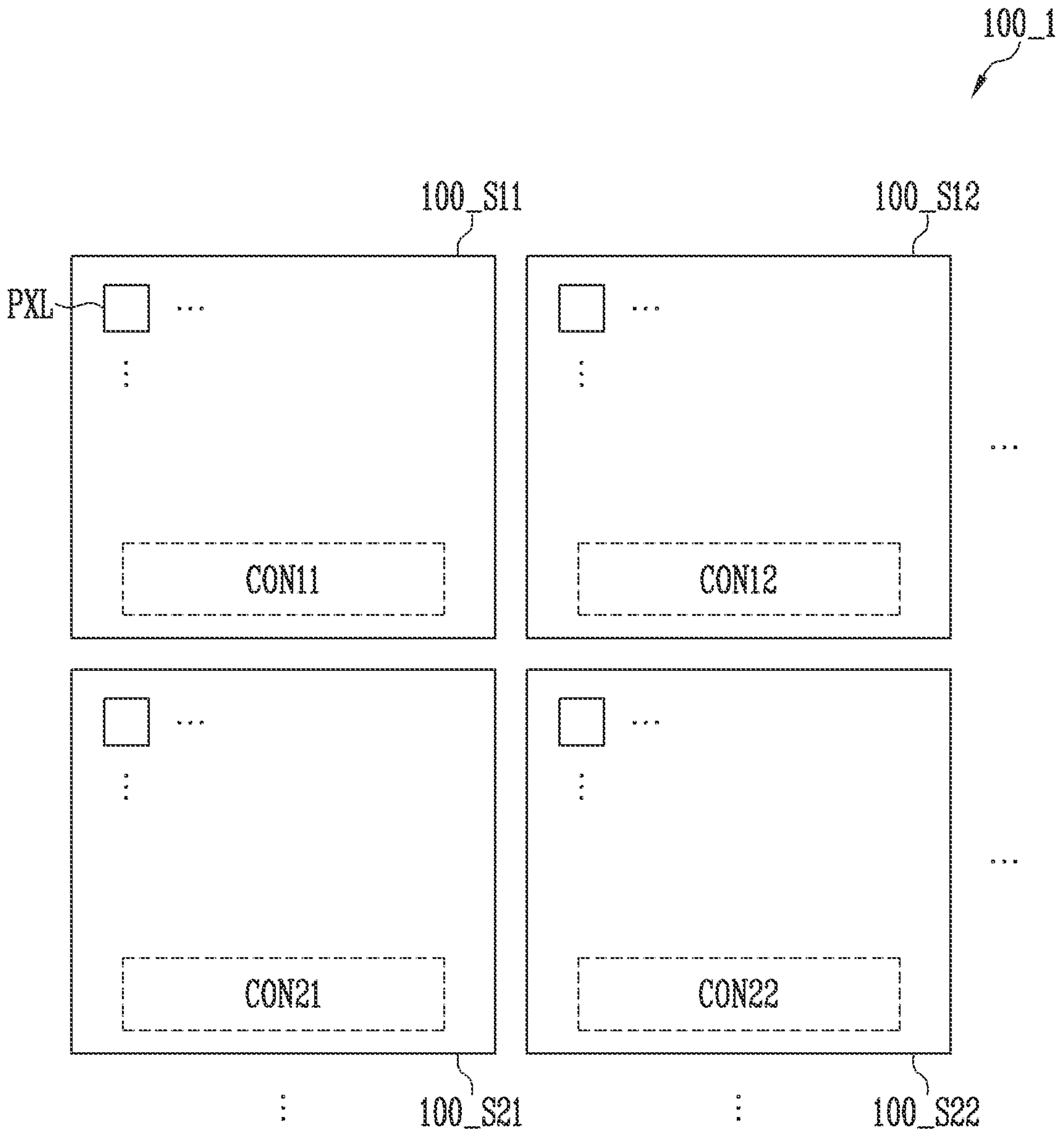
FIG. 14 is a diagram illustrating a display device according to one or more other embodiments.

FIG. 14 is a diagram illustrating a display device according to one or more other embodiments.

Referring to FIG. 14, the display device 100_1 may include a plurality of sub-display devices 100_S11, 100_S12, 100_S21, 100_S22, and . . . , which may be referred to as a plurality of display modules, or a plurality of display panels.

The display device 100_1 may be formed by connecting the sub-display devices 100_S11, 100_S12, 100_S21, 100_S22 . . . . In FIG. 14, the sub-display devices 100_S11, 100_S12, 100_S21, 100_S22 . . . are connected in a 2*2 arrangement, but an arrangement and the number of sub-display devices 100_S11, 100_S12, 100_S21, 100_S22 . . . are not limited thereto.

Each of the sub-display devices 100_S11, 100_S12, 100_S21, 100_S22 . . . may independently output different images. Alternatively, each of the sub-display devices 100_S11, 100_S12, 100_S21, 100_S22 . . . may share one image, may divide the one image into a plurality of images, and may output the images. The sub-display devices 100_S11, 100_S12, 100_S21, 100_S22 . . . may be located adjacent to each other so that a user may recognize the sub-display devices 100_S11, 100_S12, 100_S21, 100_S22 . . . of the display device 100_1 as one screen rather than separate screens.

Each of the sub-display devices 100_S11, 100_S12, 100_S21, 100_S22 . . . may include the pixel PXL and the controller (or the driver) for driving the pixel PXL. For example, an eleventh sub-display device 100_S11 may include an eleventh controller CON11, a twelfth sub-display device 100_S12 may include a twelfth controller CON12, a twenty-first sub-display device 100_S21 may include a twenty-first controller CON21, and a twenty-second sub-display device 100_S22 may include a twenty-second controller CON22.

Each of the sub-display devices 100_S11, 100_S12, 100_S21, 100_S22 . . . may include the pixel PXL and the controller (or the driver) for driving the pixel PXL. For example, an eleventh sub-display device 100_S11 may include an eleventh controller CON11, a twelfth sub-display device 100_S12 may include a twelfth controller CON12, a twenty-first sub-display device 100_S21 may include a twenty-first controller CON21, and a twenty-second sub-display device 100_S22 may include a twenty-second controller CON22.

Each of the sub-display devices 100_S11, 100_S12, 100_S21, 100_S22 . . . may calculate the color coordinate of a corresponding image (or image data), and may determine the driving method of the pixel PXL (or pixels) based on the color coordinate. That is, the display device 100 of FIG. 1 may determine the driving method in a unit of the pixel PXL (or the sub-pixel), but the display device 100_1 of FIG. 14 may determine the driving method in a unit of the sub-display device.

Figure 15:
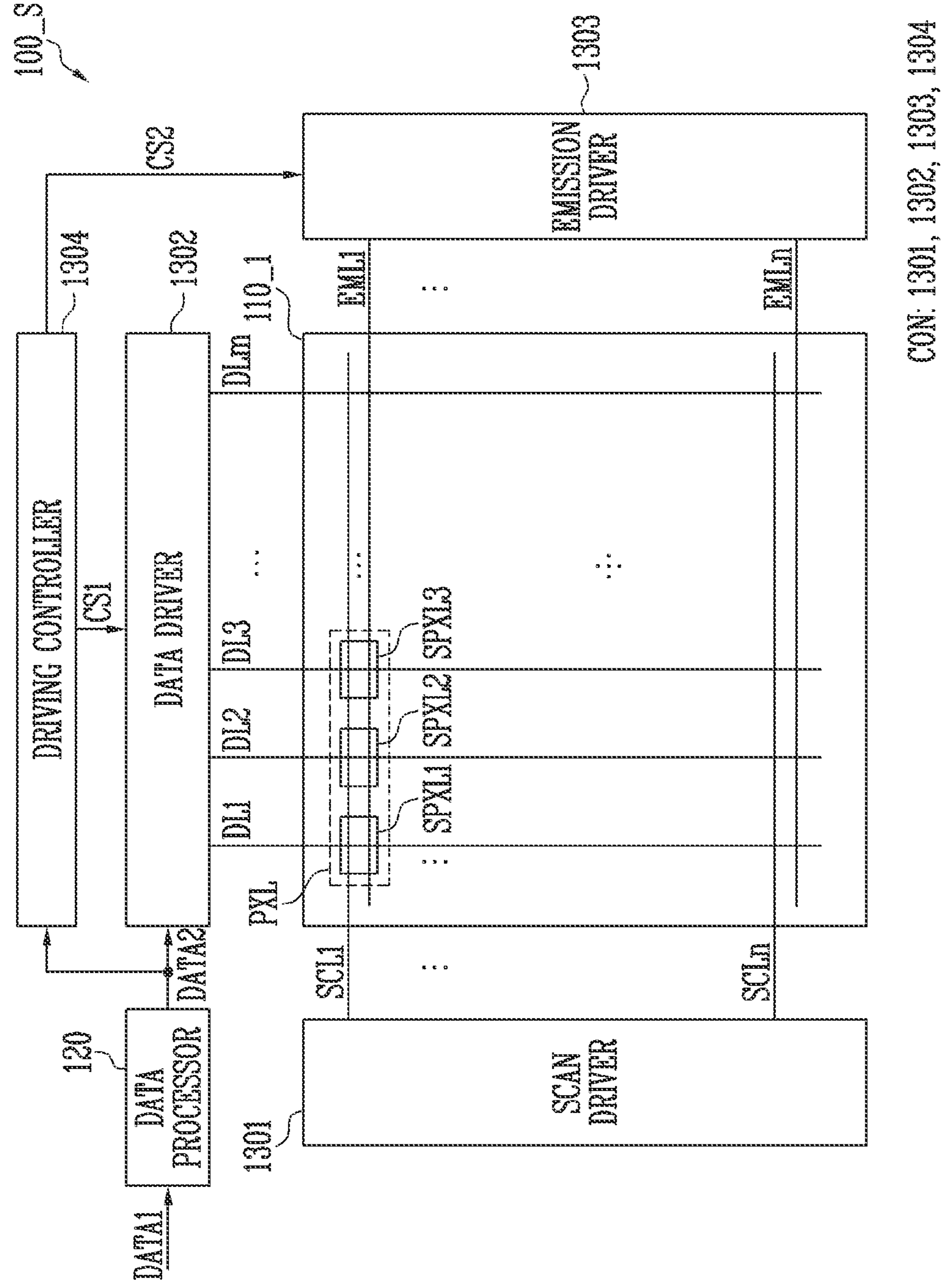
FIG. 15 is a diagram illustrating one or more embodiments of a sub-display device included in the display device of FIG. 14.

FIG. 15 is a diagram illustrating one or more embodiments of the sub-display device included in the display device of FIG. 14.

Referring to FIGS. 14 and 15, the sub-display devices 100_S11, 100_S12, 100_S21, 100_S22 . . . may be substantially identical to or similar to each other, and the sub-display device 100_S may be one of the sub-display devices 100_S11, 100_S12, 100_S21, 100_S22. . . .

The sub-display device 100_S may include a display unit 110_1 (or a display panel) and a controller CON, and the controller CON may include a scan driver 1301 (or a gate driver), a data driver 1302 (or a source driver), an emission driver 1303 (or a duty controller), and a driving controller 1304. The data processor 120 may be included in the sub-display device 100_S, but the present disclosure is not limited thereto. Only one data processor 120 may be provided in the display device 100_1, and the data processor 120 may be commonly connected to the sub-display devices 100_S11, 100_S12, 100_S21, 100_S22 . . . . Because the data processor 120 is described with reference to FIG. 1, an overlapping description is not repeated.

The display unit 110_1 may display an image. The display unit 110_1 may include scan lines SCL1 to SCLn (where n is a positive integer), data lines DL1, DL2, DL3 . . . , DLm (where m is a positive integer), emission control lines EML1 to EMLn (or duty control lines), and a pixel PXL. The pixel PXL may include at least one first sub-pixel SPXL1, at least one second sub-pixel SPXL2, and at least one third sub-pixel SPXL3. As described with reference to FIG. 1, the first sub-pixel SPXL1, the second sub-pixel SPXL2, and the third sub-pixel SPXL3 may emit light in different colors.

The sub-pixels SPXL1, SPXL2, SPXL3 . . . may be located or positioned in an area partitioned by the scan lines SCL1 to SCLn and the data lines DL1 to DLm. The sub-pixels SPXL1, SPXL2, SPXL3 . . . (or the pixel PXL) may be located in a matrix form in the display unit 110_1, but the present disclosure is not limited thereto.

Each of the sub-pixels SPXL1, SPXL2, SPXL3 . . . may be connected to at least one of the scan lines SCL1 to SCLn, one of the data lines DL1 to DLm, and one of the emission control lines EML1 to EMLn. The sub-pixel is described later with reference to FIG. 16.

The scan driver 1301 may generate a scan signal and provide the scan signal to the scan lines SCL1 to SCLn. For example, the scan driver 1301 may be implemented as a shift register that generates and outputs the scan signal by sequentially shifting a start signal of a pulse shape using clock signals. The start signal may be provided from the data processor 120.

The scan driver 1301 may be formed on the display unit 110_1 together with the pixel PXL, but the present disclosure is not limited thereto. For example, the scan driver 1301 may be implemented as an integrated circuit, mounted on a circuit film, and connected to the display unit 110_1 through the circuit film.

The data driver 1302 may generate the data signal (or the data voltage) based on the image data DATA2, and may provide the data signal to the display unit 110_1 (or the pixel PXL) through the data lines DL1 to DLm. For example, the data driver 1302 may include a shift register that generates a sampling signal by shifting a horizontal start signal in synchronization with a data clock signal, a latch that latches the image data DATA2 in response to the sampling signal, a digital-to-analog converter (or a decoder) that converts a latched image data (for example, digital data) into an analog data signal, and a buffer (or an amplifier) that outputs the data signal to the data line DL. The data clock signal and the horizontal start signal may be provided from the data processor 120.

In one or more embodiments, the data driver 1302 may vary the data signal based on a first control signal CS1. The first control signal CS1 may be provided from the driving controller 1304.

For example, the data driver 1302 may generate the data signal corresponding to the first case CASE1 or the second case CASE2 shown in FIG. 4, in response to the first control signal CS1. For example, the data driver 1302 may generate the data signal corresponding to the first case CASE1 in a first mode (or a normal mode), may switch from the first mode to a second mode (or a high color reproduction mode) in response to the first control signal CS1, and may generate the data signal corresponding to the second case CASE2 in the second mode.

The emission driver 1303 may generate an emission control signal (or a duty control signal) and may provide the emission control signal to the display unit 110_1 (or the pixel PXL) through the emission control lines EML1 to EMLn. Similar to the scan driver 1301, the emission driver 1303 may be implemented as a shift register.

In one or more embodiments, the emission driver 1303 may vary a duty of the emission control signal based on the second control signal CS2. The second control signal CS2 may be provided from the driving controller 1304. The emission time of the pixel PXL may vary according to the duty of the emission control signal.

For example, the emission driver 1303 may generate the emission control signal corresponding to the first case CASE1 or the second case CASE2 shown in FIG. 4 in response to the second control signal CS2. For example, the emission driver 1303 may generate the emission control signal corresponding to the first case CASE1 in the first mode (or the normal mode), may switch from the first mode to the second mode in response to the second control signal CS2, and may generate the emission control signal corresponding to the second case CASE2 in the second mode.

The driving controller 1304 may generate the first control signal CS1 and the second control signal CS2 based on the image data DATA2.

In one or more embodiments, the driving controller 1304 may determine whether an image to be displayed on the display unit 110_1 is an image suitably using high color reproduction based on the image data DATA2, and may generate the first and second control signals CS1 and CS2 based on a determination result. For example, when the high color reproduction is not required (that is, when the image is a normal image), the driving controller 1304 may control the data driver 1302 and the emission driver 1303 to be driven according to the first case CASE1 of FIG. 4 (or the normal mode). As another example, when the high color reproduction is suitably used (that is, when the image is suitably using the high color reproduction), the driving controller 1304 may control the data driver 1302 and the emission driver 1303 to be driven according to the second case CASE2 of FIG. 4 (or the high color reproduction mode).

In other embodiments, the driving controller 1304 may calculate a color coordinate or a tristimulus value of the image to be displayed on the display unit 110_1 based on the image data DATA2, and may generate the first and second control signals CS1 and CS2 based on the color coordinate or the tristimulus value.

In one or more embodiments, the driving controller 1304 may calculate the color coordinate or the tristimulus value of the image based on the grayscale values included in the image data DATA2. The driving controller 1304 may operate similarly to the first calculator 131 described with reference to FIG. 8. For example, the first calculator 131 may calculate an average grayscale value for each color, and may calculate the color coordinate or the tristimulus value of the image based on the average grayscale value. As another example, the first calculator 131 may calculate color coordinates of the pixels, and may determine a color coordinate having the highest color purity among the color coordinates as the color coordinate of the image.

In one or more embodiments, the driving controller 1304 may generate the first control signal CS1 and the second control signal CS2 based on the color coordinate or the tristimulus value of the image.

For example, similarly to the second calculator 132 and the selector 133 described with reference to FIG. 8, the driving controller 1304 may select at least a peak wavelength corresponding to the color coordinate or the tristimulus value of the image, and may generate the first control signal CS1 and the second control signal CS2 based on the selected peak wavelength.

For example, the driving controller 1304 may select the peak wavelengths of about 636 nm, about 530 nm, and about 455 nm included in the first section of FIG. 9 with respect to the first point P1 of FIG. 7. In this case, the driving controller 1304 may control the data driver 1302 and the emission driver 1303 to be driven according to the first case CASE1 of FIG. 4. For example, the driving controller 1304 may generate the second control signal CS2 that controls the emission driver 1303 to generate an emission control signal having an emission duty (or a duty ratio) of about 50%.

As another example, the driving controller 1304 may select the peak wavelengths of about 638 nm, about 530 nm, and about 452 nm shown in FIG. 9 with respect to the second point P2 of FIG. 7. When the first to third sub-pixels SPXL1, SPXL2, and SPXL3 operate according to the same emission control signal, the driving controller 1304 may select the peak wavelength included in the highest section, for example, about 452 nm of the fourth section. For example, a driving current corresponding to light of the peak wavelength of about 452 nm may be about 4 times a driving current (or a peak current) corresponding to light of the peak wavelength of about 455 nm. In this case, the driving controller 1304 may control the data driver 1302 and the emission driver 1303 to be driven according to the second case CASE2 of FIG. 4. For example, the driving controller 1304 may generate the first control signal CS1 for controlling the data driver 1302 so that the driving current is increased by about 4 times, and generate the second control signal CS2 for controlling to generate the emission control signal so that the emission duty is decreased to about $1/4^{th}$.

As described above, the driving controller 1304 may determine whether the image suitably uses the high color reproduction, or may calculate the tristimulus value or the color coordinate of the image, and may determine the current amount (or the peak current) and the emission duty of the pixel PXL (or the first to third sub-pixels SPXL1, SPXL2, and SPXL3. Through this, the sub-display device 100_S may display an image of a high color area while reducing or minimizing power consumption.

Figure 16:
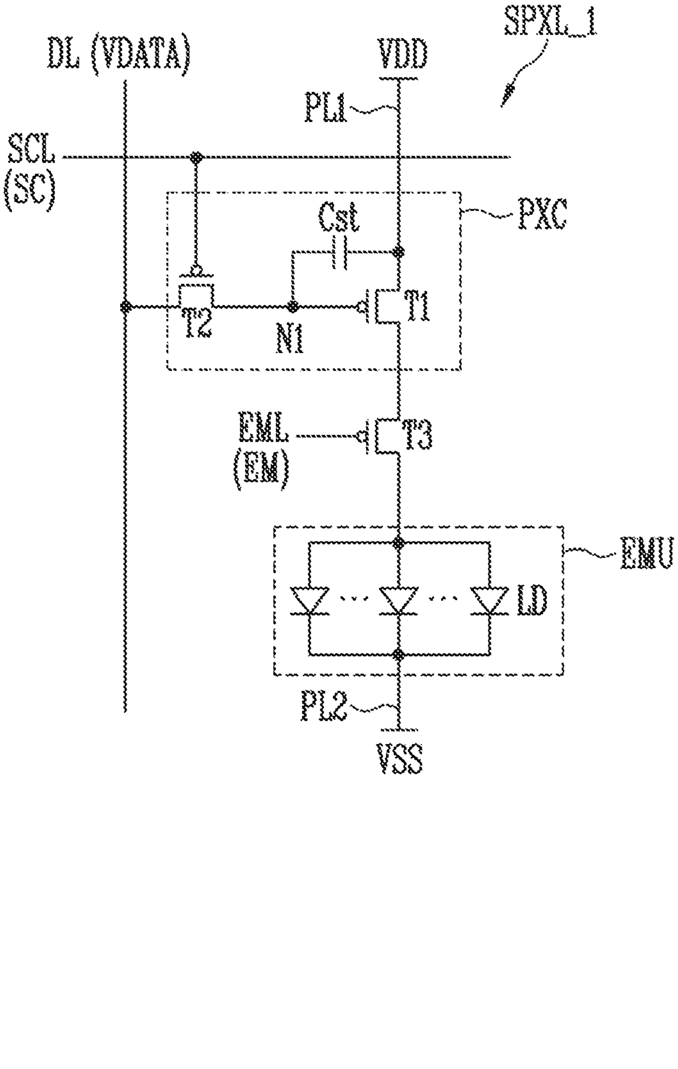
FIG. 16 is a diagram illustrating one or more embodiments of a sub-pixel included in the sub-display device of FIG. 15.

FIG. 16 is a diagram illustrating one or more embodiments of a sub-pixel included in the sub-display device of FIG. 15.

Referring to FIGS. 15 and 16, the sub-pixel SPXL_1 may be connected to a scan line SCL, a data line DL, and an emission control line EML. The sub-pixel SPXL_1 may be one of the first to third sub-pixels SPXL1, SPXL2, and SPXL3, the scan line SCL may be one of the scan lines SCL1 to SCLn, the data line DL may be one of the data lines DL1 to DLm, and the emission control line EML may be one of the emission control lines EML1 to EMLn.

The sub-pixel SPXL_1 may include a light emitting unit EMU, a first transistor T1 (or a driving transistor), a second transistor T2 (or a first switching transistor), a third transistor T3 (a duty control transistor, or an emission control transistor), and a storage capacitor Cst. Each of the first to third transistors T1 to T3 may be a thin film transistor including a polysilicon semiconductor, but the present disclosure is not limited thereto. For example, at least some of the first to third transistors T1 to T3 may include an oxide semiconductor or may be implemented as an N-type semiconductor or a P-type semiconductor.

The light emitting unit EMU may include at least one light emitting element LD connected between the first power line PL1 and the second power line PL2. The first power VDD may be applied to the first power line PL1, and the second power VSS may be applied to the second power line PL2.

For example, as shown in FIG. 16, the light emitting unit EMU may include a plurality of light emitting elements LD connected in parallel between the first power line PL1 and the second power line PL2. As another example, the light emitting unit EMU may include a plurality of light emitting elements LD connected in series, instead of the plurality of light emitting elements LD connected in parallel. As still another example, the light emitting unit EMU may include a plurality of light emitting elements LD connected in a series/parallel mixed structure.

The light emitting element LD may be the light emitting element LD shown in FIG. 11, but a type of the light emitting element LD is not limited thereto. For example, the light emitting element LD may be configured of an inorganic light emitting diode such as a micro LED or a quantum dot LED. As another example, the light emitting element LD may be configured as a light emitting diode in which an organic material and an inorganic material are combined.

A first electrode of the light emitting unit EMU (or the light emitting element LD) may be connected to (or electrically connected to) a second electrode of the third transistor T3. The first electrode of the light emitting unit EMU may be an anode electrode. The first electrode of the light emitting unit EMU may be connected (or electrically connected) to the first power line PL1 via the third transistor T3 and the first transistor T1. A second electrode of the light emitting unit EMU (or the light emitting element LD) may be connected to the second power line PL2. The second electrode of the light emitting unit EMU may be a cathode electrode. The light emitting unit EMU (or the light emitting element LD) may generate light of a luminance (e.g., predetermined luminance) in response to a current amount (or a driving current) supplied from the first transistor T1.

A first electrode of the first transistor T1 may be connected to the first power line PL1, and a second electrode of the first transistor T1 may be connected to a first electrode of the third transistor T3. One of the first electrode and the second electrode of the first transistor T1 may be a drain electrode, and the other may be a source electrode. A gate electrode of the first transistor T1 may be connected to a first node N1. The first transistor T1 may control a current amount flowing to the light emitting unit EMU in response to a voltage of the first node N1 (or a gate-source voltage applied between the first electrode and a gate electrode of the first transistor T1).

A first electrode of the second transistor T2 may be connected to the data line DL, and a second electrode of the second transistor T2 may be connected to the first node N1. A gate electrode of the second transistor T2 may be connected to the scan line SCL. When a scan signal SC of a turn-on voltage level is supplied to the scan line SCL, the second transistor T2 may be turned on to transmit the data signal VDATA (or the data voltage) from the data line DL to the first node N1.

The storage capacitor Cst may be formed or connected between the first node N1 and the first power line PL1. The storage capacitor Cst may store the voltage of the first node N1, or a charge corresponding to the voltage of the first node N1 may be charged in the storage capacitor Cst.

The first electrode of the third transistor T3 may be connected to the second electrode of the first transistor T1, and a second electrode of the third transistor T3 may be connected to the first electrode of the light emitting unit EMU. A gate electrode of the third transistor T3 may be connected to the emission control line EML. When an emission control signal EM of a turn-on voltage level is supplied to the emission control line EML, the third transistor T3 may be turned on, and the driving current may flow through the light emitting unit EMU. As a duty ratio (or an on-duty ratio) of the emission control signal EM decreases, an emission time of the emission unit EMU may be shortened.

As described above, the sub-pixel SPXL_1 may include the third transistor T3 connected in series to the light emitting unit EMU, and a luminance of the sub-pixel SPXL_1 may be controlled according to the duty ratio of the emission control signal EM provided to the third transistor T3.

Meanwhile, the third transistor T3 may be connected to the light emitting unit EMU in series, but the present disclosure is not limited thereto. For example, the third transistor T3 may be connected to the light emitting unit EMU in parallel, that is, the third transistor T3 may be connected to both ends of the light emitting unit EMU. In this case, as the duty ratio (or the on-duty ratio) of the emission control signal EM increases, the emission time of the emission unit EMU may be shortened.

Although the technical spirit of the disclosure has been described in detail in accordance with the above-described embodiments, it should be noted that the above-described embodiments are for the purpose of description and not of limitation. In addition, those skilled in the art may understand that various modifications are possible within the scope of the technical spirit of the disclosure.

The scope of the disclosure is not limited to the details described in the detailed description of the specification, but should be defined by the claims, with functional equivalents thereof to be included therein. In addition, it is to be construed that all changes or modifications derived from the meaning and scope of the claims and equivalent concepts thereof are included in the scope of the disclosure.

What is claimed is:

1. A display device comprising:

a display panel comprising a pixel that comprises sub-pixels for emitting light in respective colors; and a driver configured to:

adjust a current amount flowing through the sub-pixels and to adjust an emission duty of the sub-pixels;

drive one sub-pixel among the sub-pixels having a luminance with a first current amount and with a first emission duty when a color coordinate of an image expressed by the pixel is within a reference color space; and drive the one sub-pixel having the luminance with a second current amount that is greater than the first current amount and with a second emission duty that is less than the first emission duty when the color coordinate is outside of the reference color space and in a second color space, the second color space including the reference color space and being greater than the reference color space, wherein the driver comprises a selector configured to select a peak wavelength corresponding to least power consumption among power consumption of peak wavelengths of the one sub-pixel corresponding to the color coordinate.

2. The display device according to claim 1, wherein the sub-pixels comprise an inorganic light emitting diode.

3. The display device according to claim 2, wherein a peak wavelength of light emitted from the one sub-pixel is shifted according to a current amount flowing through the one sub-pixel.

4. The display device according to claim 2, wherein the pixel comprises a first sub-pixel for emitting light in red, a second sub-pixel for emitting light in green, and a third sub-pixel for emitting light in blue, wherein the first sub-pixel comprises an AlGaInP-based inorganic material, and wherein the second sub-pixel and the third sub-pixel comprise a GaN-based inorganic material.

5. The display device according to claim 4, wherein light emitted from the first sub-pixel has a peak wavelength in a range of about 635 nm to about 640 nm, wherein light emitted from the second sub-pixel has a peak wavelength in a range of about 520 nm to about 530 nm, and wherein light emitted from the third sub-pixel has a peak wavelength in a range of about 450 nm to about 460 nm.

6. The display device according to claim 1, wherein the second current amount is about twice or more of the first current amount, and wherein the second emission duty is about ½ or less of the first emission duty.

7. The display device according to claim 1, wherein the driver further comprises:

a first calculator configured to calculate the color coordinate of the pixel based on grayscale values corresponding to the sub-pixels;

a second calculator configured to calculate the power consumption of the peak wavelengths of the one sub-pixel corresponding to the color coordinate; and a signal generator configured to determine a peak current and the emission duty for the one sub-pixel based on the peak wavelength.

8. The display device according to claim 7, wherein the selector is configured to select a shortest peak wavelength among the peak wavelengths when the one sub-pixel emits light in red.

9. The display device according to claim 7, wherein the selector is configured to select a longest peak wavelength among the peak wavelengths when the one sub-pixel emits light in green or blue.

10. The display device according to claim 1, wherein some of the sub-pixels are configured to emit light with different emission duties.

11. The display device according to claim 1, wherein the sub-pixels are configured to emit light with a same emission duty.

12. The display device according to claim 1, wherein the driver comprises:

a first calculator configured to calculate a tristimulus value of the image based on grayscale values corresponding to the sub-pixels;

a second calculator configured to determine a peak wavelength corresponding to the tristimulus value; and a signal generator configured to determine a peak current and the emission duty for the one sub-pixel based on the peak wavelength corresponding to the tristimulus value.

13. The display device according to claim 1, wherein the driver comprises:

a calculator configured to calculate a color coordinate of the pixel based on grayscale values corresponding to the sub-pixels;

a determiner configured to determine whether the color coordinate is within the reference color space; and a signal generator configured to determine a peak current and the emission duty for the one sub-pixel based on a determination result of the determiner.

14. A method of driving a display device in a display device comprising a pixel that comprises sub-pixels for emitting light of different colors, the method comprising:

calculating a color coordinate of an image expressed by the pixel based on grayscale values corresponding to the pixel; and driving the sub-pixels by increasing a current amount flowing through at least one of the sub-pixels and decreasing an emission duty of the at least one of the sub-pixels based on the color coordinate when the color coordinate of the pixel for a same luminance is out of a reference color space and in a second color space, the second color space including the reference color space and being greater than the reference color space;

wherein driving the sub-pixels comprises selecting a peak wavelength corresponding to least power consumption among power consumption of peak wavelengths.

15. The method according to claim 14, wherein the current amount increases by about twice or more, and the emission duty decreases to about ½ or less, when the color coordinate of the pixel is out of the reference color space with respect to a same luminance.

16. The method according to claim 14, wherein the driving the sub-pixels further comprises:

calculating the power consumption of the peak wavelengths of one sub-pixel corresponding to the color coordinate; and determining a peak current and the emission duty for the one sub-pixel based on the peak wavelength.

17. The method according to claim 16, wherein a shortest peak wavelength is selected among the peak wavelengths when the one sub-pixel emits light in red.

18. The method according to claim 16, wherein a longest peak wavelength is selected among the peak wavelengths when the one sub-pixel emits light green or blue.

19. The method according to claim 14, wherein the driving the sub-pixels comprises driving at least a portion of the sub-pixels with different emission duties.

20. A display device comprising:

a display panel comprising sub-pixels; and a driver configured to:

adjust a current amount flowing through the sub-pixels and to adjust an emission duty of the sub-pixels based on image data;

operate in a first mode when an image corresponding to the image data is a normal image corresponding to a reference color space; and operate in a second mode wherein the current amount is larger than the current amount in the first mode, and the emission duty is less than the emission duty in the first mode, when the image corresponding to the image data is an image using wide color gamut corresponding to a second color space, the second color space including the reference color space and being greater than the reference color space, wherein the driver comprises a selector configured to select a peak wavelength corresponding to least power consumption among the power consumption of the peak wavelengths of one sub-pixel corresponding to a color coordinate within the reference color space.

* * * * *